US011252627B2

(12) United States Patent
Ali et al.

(10) Patent No.: US 11,252,627 B2
(45) Date of Patent: Feb. 15, 2022

(54) MAINTAINING LOCAL OFFLOADING OF TRAFFIC IN A HANDOVER FROM A FIFTH GENERATION SYSTEM (5GS) TO AN EVOLVED PACKET SYSTEM (EPS)

(71) Applicant: Cisco Technology, Inc., San Jose, CA (US)

(72) Inventors: Irfan Ali, Palo Alto, CA (US); Subrata Mukherjee, Plano, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/885,934

(22) Filed: May 28, 2020

(65) Prior Publication Data

US 2021/0377838 A1 Dec. 2, 2021

(51) Int. Cl.
*H04W 36/00* (2009.01)
*H04W 36/22* (2009.01)
(Continued)

(52) U.S. Cl.
CPC ............. *H04W 36/22* (2013.01); *H04W 8/08* (2013.01); *H04W 36/0044* (2013.01);
(Continued)

(58) Field of Classification Search
CPC . H04W 36/22; H04W 36/0044; H04W 76/11; H04W 80/10; H04W 76/12; H04W 48/16; H04W 8/08
See application file for complete search history.

(56) References Cited

U.S. PATENT DOCUMENTS

2012/0295624 A1 11/2012 Tang
2015/0373607 A1* 12/2015 Zhu ....................... H04W 76/12
370/331
(Continued)

FOREIGN PATENT DOCUMENTS

WO 2019027742 A1 2/2019
WO 2020014337 A1 1/2020
WO 2020033373 A1 2/2020

OTHER PUBLICATIONS

Yao et al., U.S. Appl. No. 62/910,288, filed Oct. 2019.*

*Primary Examiner* — Lakeram Jangbahadur
(74) *Attorney, Agent, or Firm* — Edell, Shapiro & Finnan, LLC

(57) ABSTRACT

A network node includes control plane functionality for managing a session of a user equipment (UE) which is anchored at a User Plane Function (UPF) anchor for communicating traffic between the UE and a data network. The node operates to obtain, from an Access and Mobility Management Function (AMF), a session context request responsive to a handover indication indicating a handover of the session from a Fifth Generation System (5GS) to an Evolved Packet System (EPS). The node identifies whether an uplink classifier (UL-CL) UPF is in use for local offloading to a local UPF anchor for delivery to a local area data network. Based on the identifying, the node obtains uplink tunnel information of the UL-CL UPF instead of the UPF anchor for establishing at least one bearer for the session and sends to the AMF a session context response including the uplink tunnel information of the UL-CL UPF.

20 Claims, 27 Drawing Sheets

(51) Int. Cl.
*H04W 80/10* (2009.01)
*H04W 76/11* (2018.01)
*H04W 48/16* (2009.01)
*H04W 76/12* (2018.01)
*H04W 8/08* (2009.01)

(52) U.S. Cl.
CPC ............ *H04W 48/16* (2013.01); *H04W 76/11* (2018.02); *H04W 76/12* (2018.02); *H04W 80/10* (2013.01)

(56) References Cited

U.S. PATENT DOCUMENTS

| | | | |
|---|---|---|---|
| 2016/0135103 A1* | 5/2016 | Lee | H04W 72/0406 |
| | | | 455/444 |
| 2016/0381606 A1 | 12/2016 | Lou et al. | |
| 2019/0098537 A1 | 3/2019 | Qiao et al. | |
| 2019/0174449 A1* | 6/2019 | Shan | H04W 60/04 |
| 2019/0373441 A1 | 12/2019 | Ryu et al. | |
| 2020/0015311 A1* | 1/2020 | Kim | H04W 68/005 |
| 2020/0351984 A1* | 11/2020 | Talebi Fard | H04W 4/08 |
| 2021/0022024 A1* | 1/2021 | Yao | H04W 24/10 |

* cited by examiner

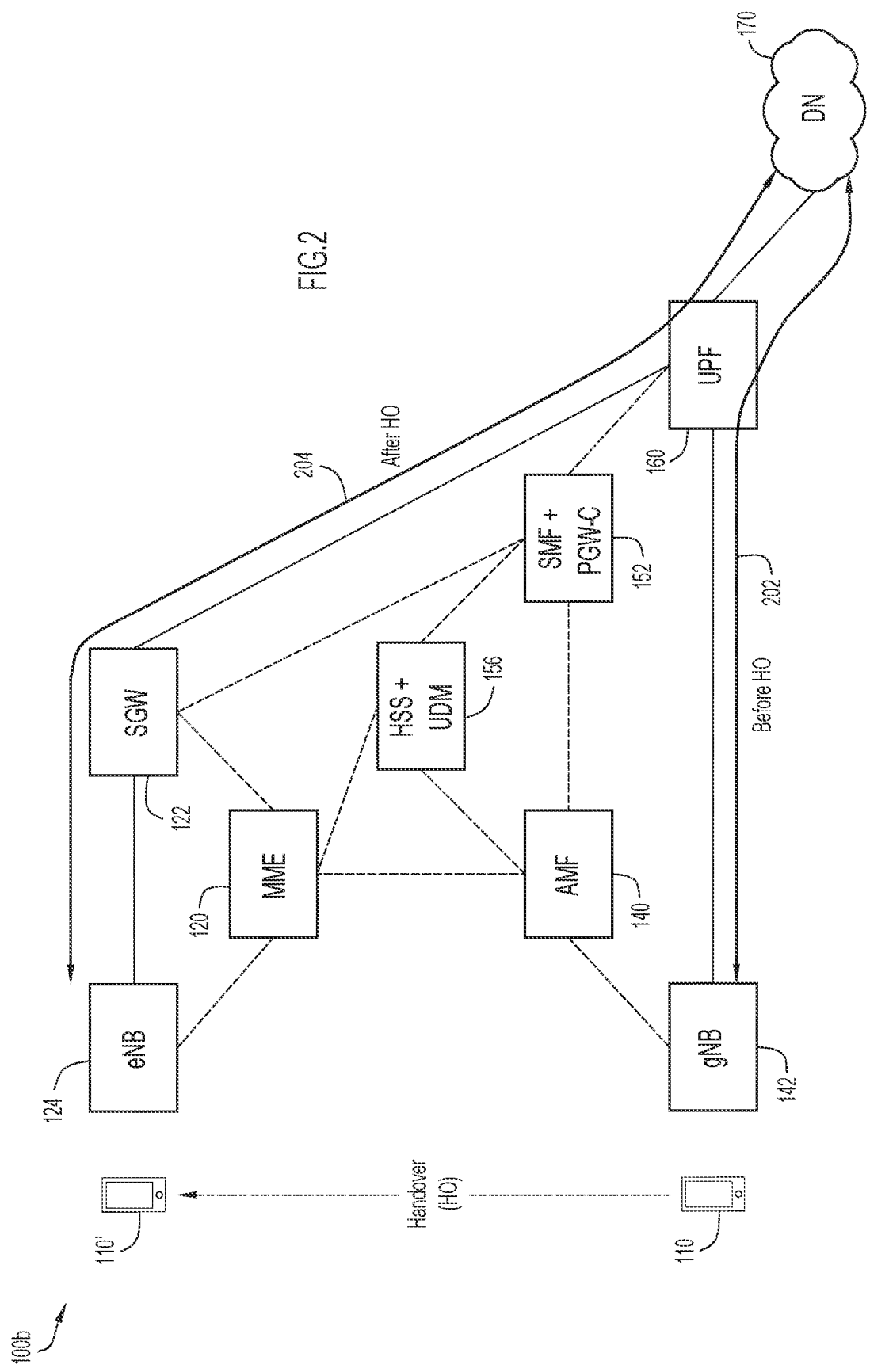

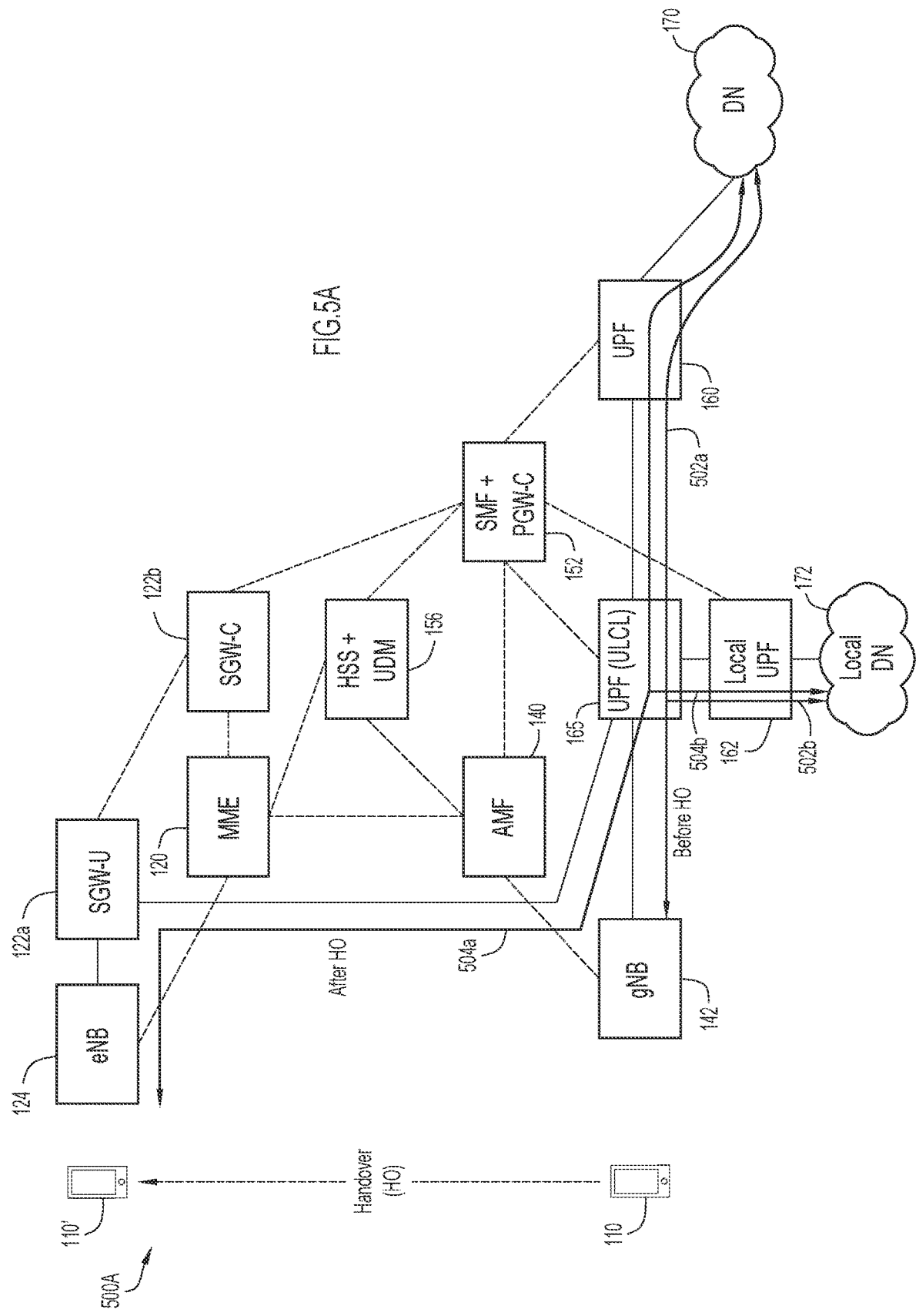

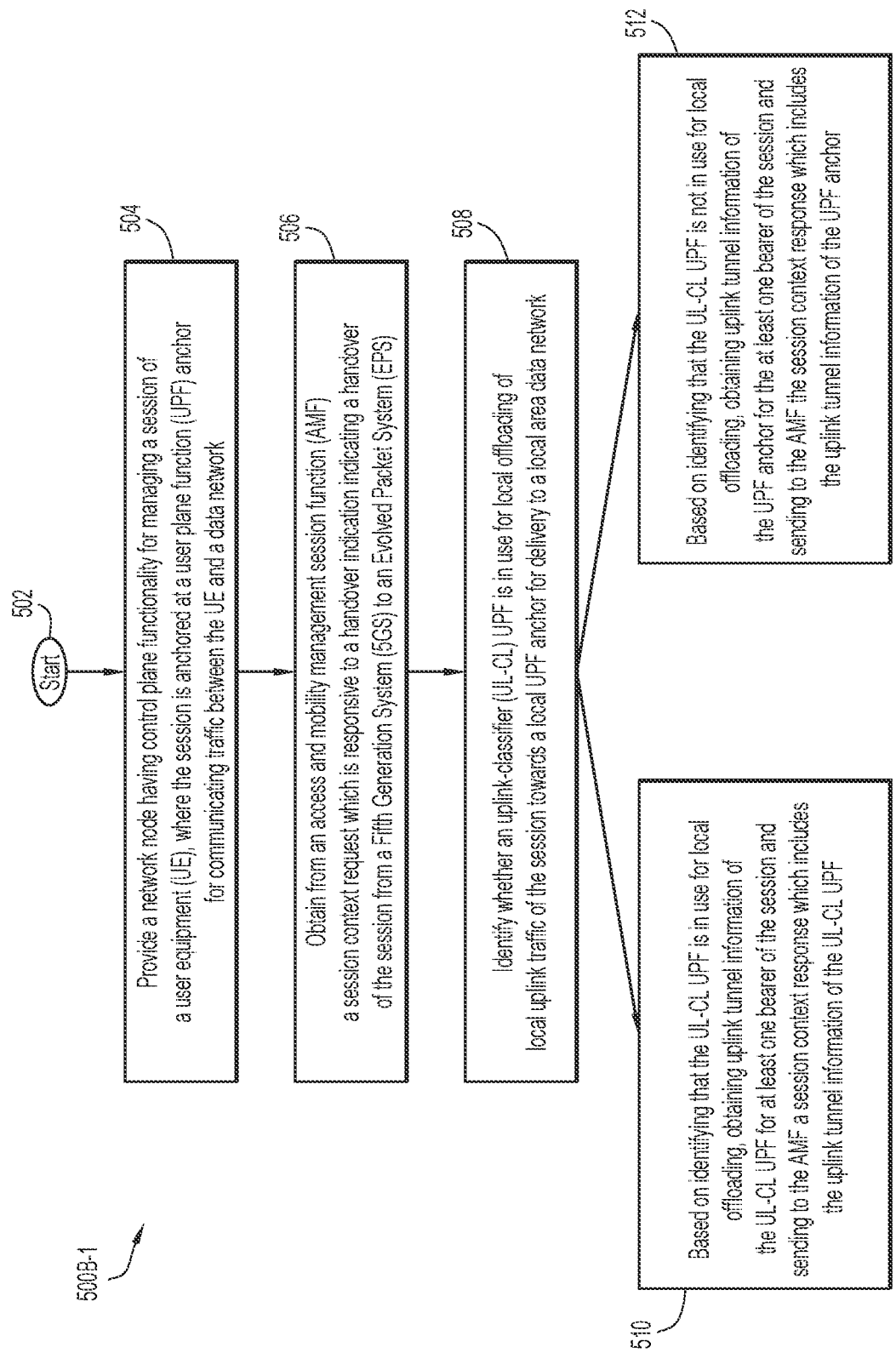

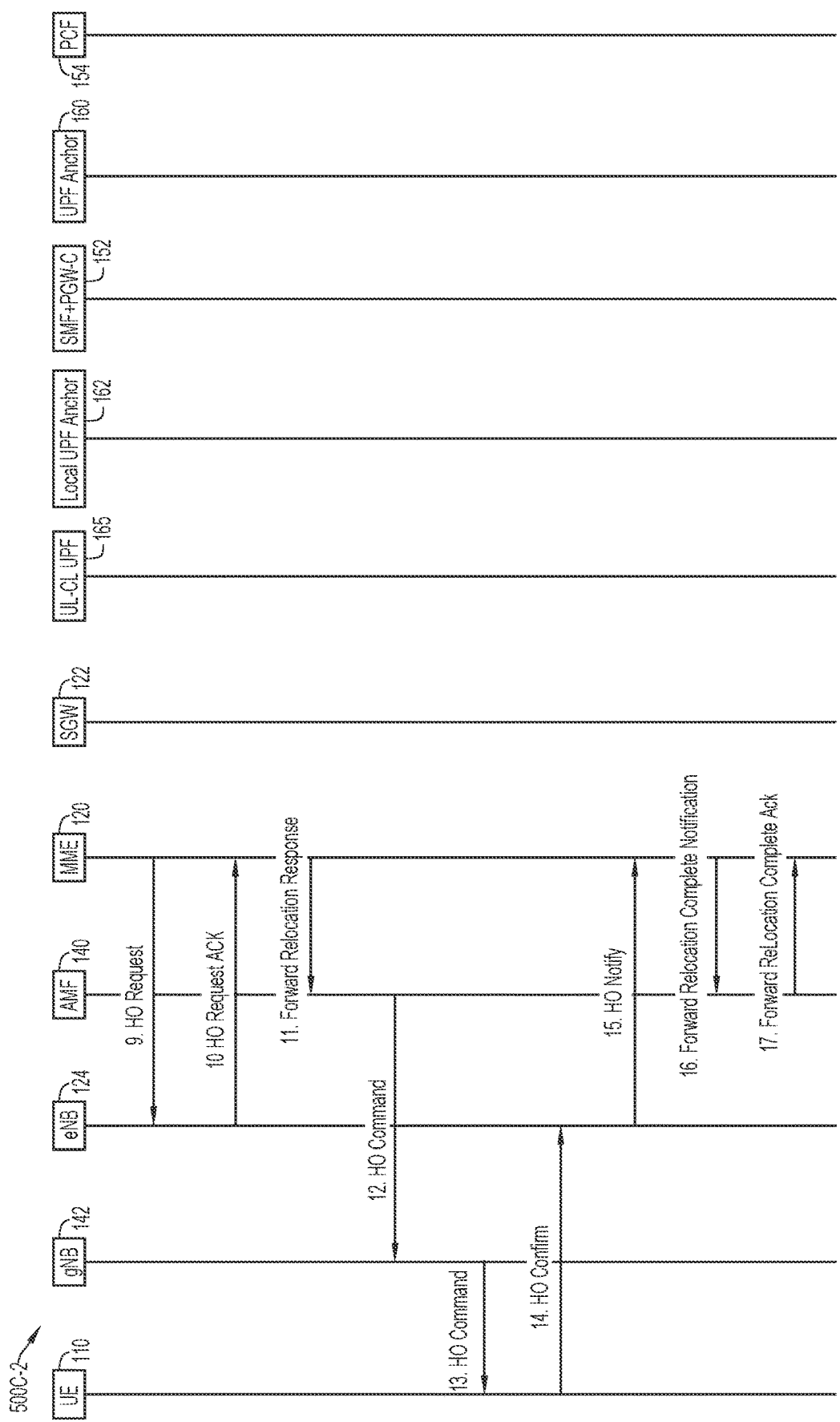

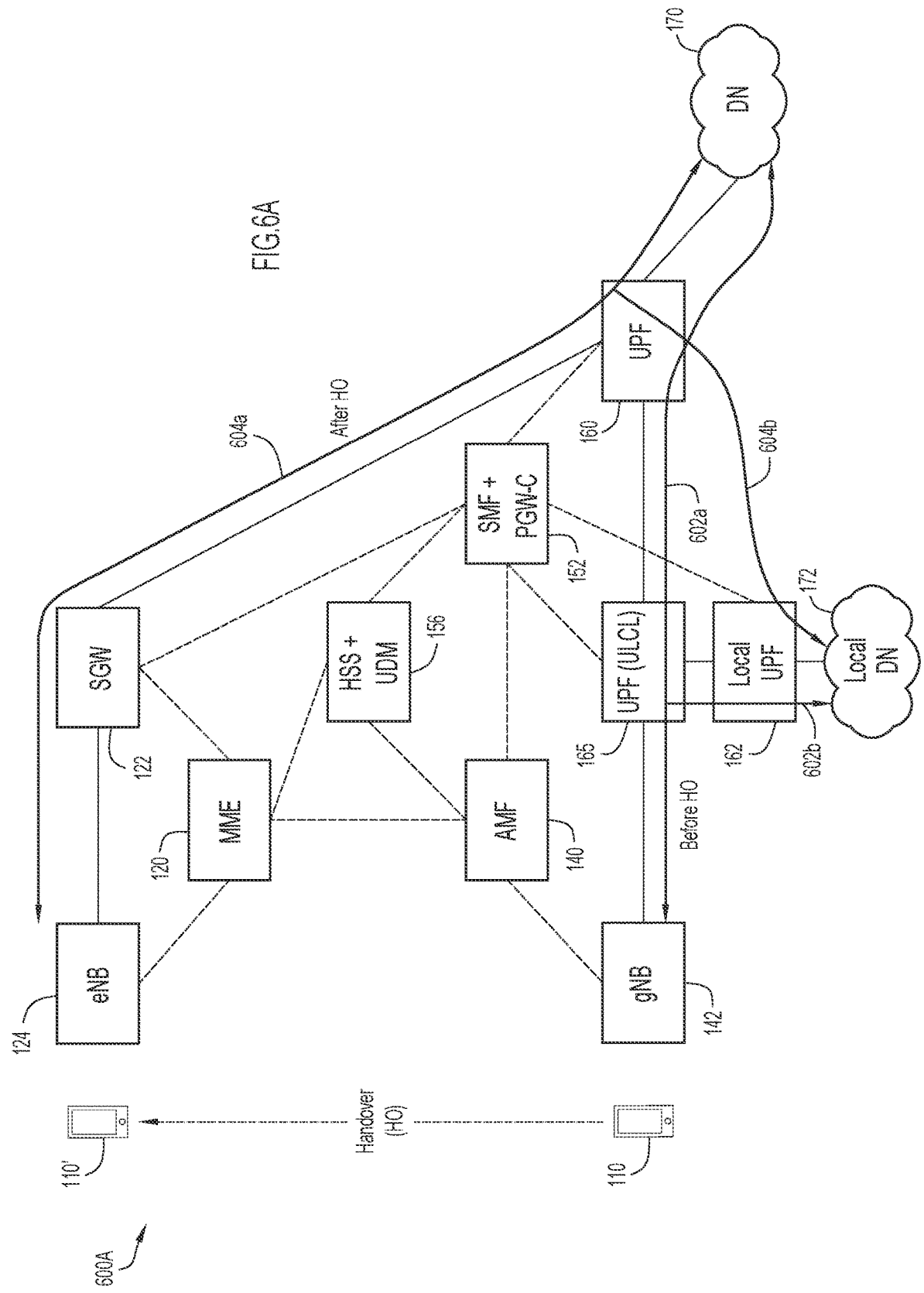

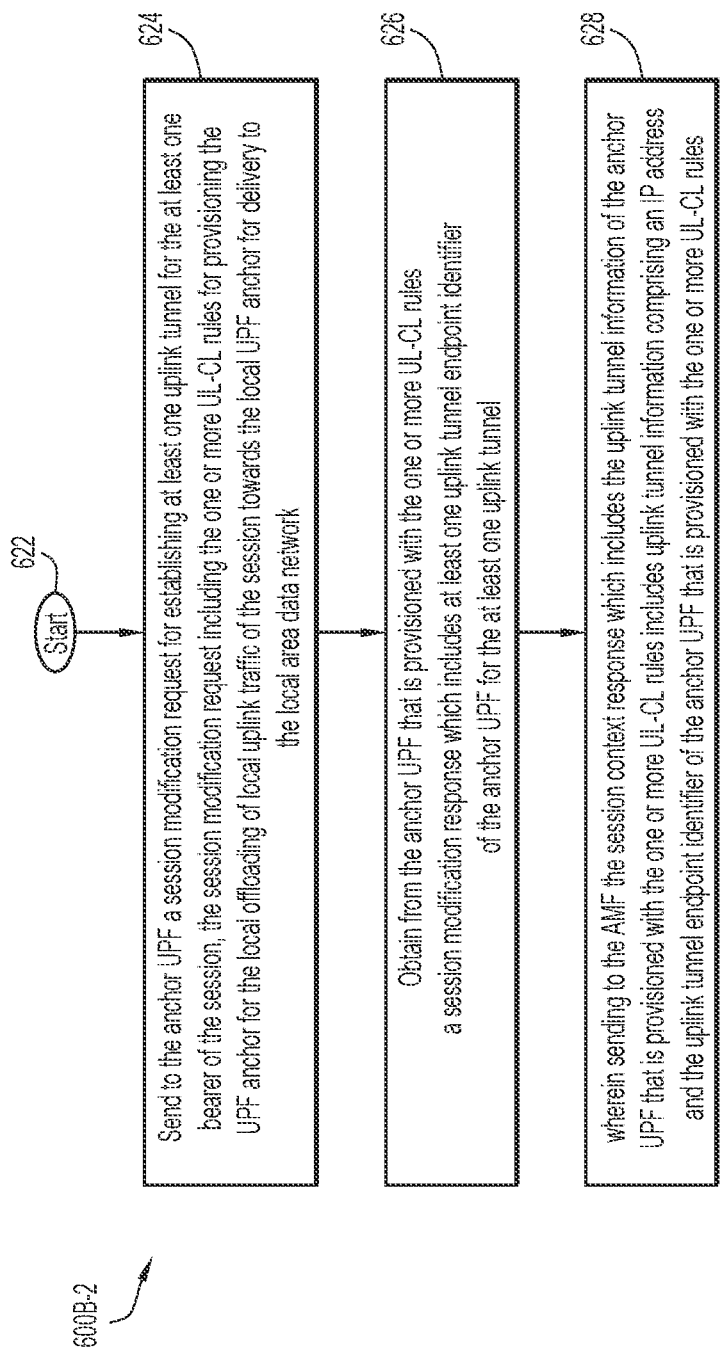

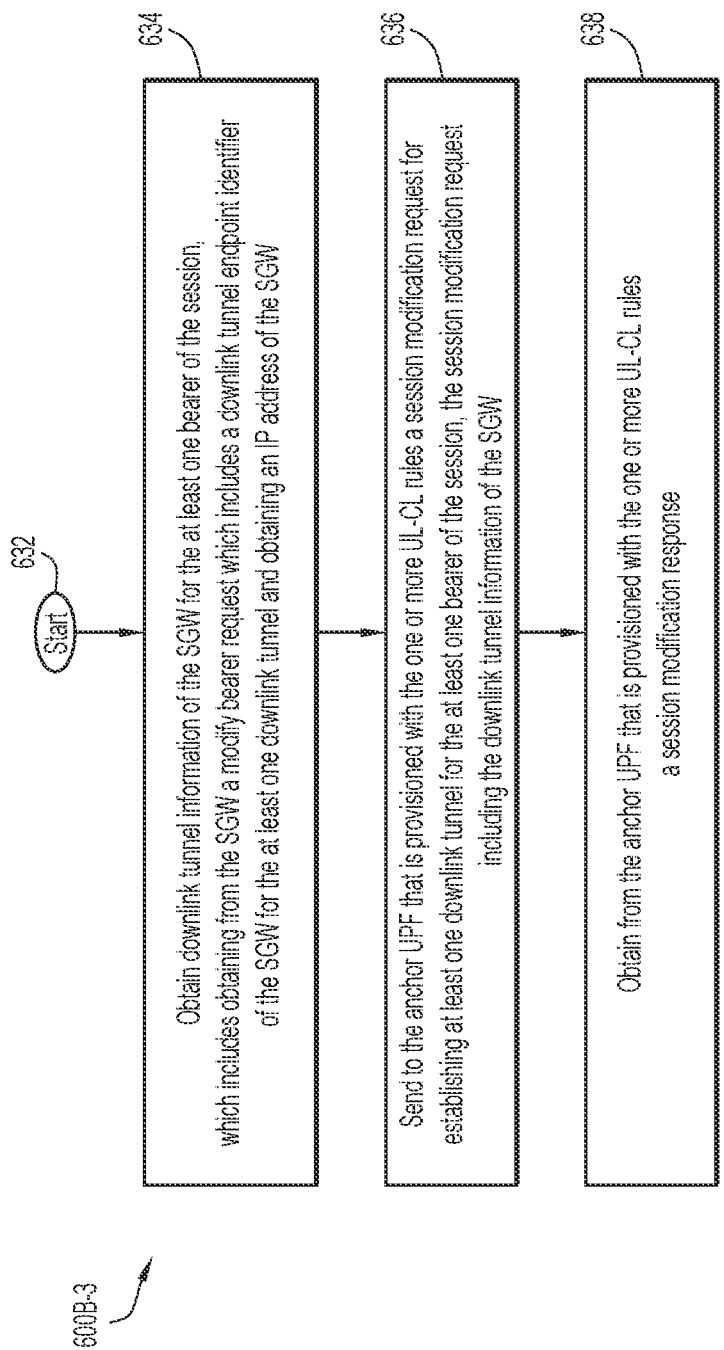

MAINTAINING LOCAL OFFLOADING OF TRAFFIC IN A HANDOVER FROM A FIFTH GENERATION SYSTEM (5GS) TO AN EVOLVED PACKET SYSTEM (EPS)

TECHNICAL FIELD

The present disclosure relates generally to maintaining a local offloading of traffic in a handover of a session of a user equipment (UE) from a Fifth Generation System (5GS) to an Evolved Packet System (EPS).

BACKGROUND

Interworking between Fourth Generation (4G) and Fifth Generation (5G) networks will play an important role in the deployment of 5G, which will initially rely on an Evolved Packet System (EPS) to be the "anchor" or underlying system. The 5G system (5GS) and the EPS utilize different radio access technologies (RATs) and core functions. In a standalone (SA) deployment of 5G, suitable interworking with the EPS to facilitate mobility between the two different systems is essential.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 2 is an illustrative representation of a 3GPP-based mobile network having the network architecture of FIG. 1, where a session of a user equipment (UE) is anchored at a User Plane Function (UPF) anchor for communicating traffic between the UE and a data network (DN);

FIGS. 5A, 5B-1 through 5B-3, and FIGS. 5C-1 through 5C-3 are figures relating to control plane functionality for interacting with and using tunnel information of a UL-CL UPF for establishing the at least one bearer with a Serving Gateway (SGW), for a handover from the 5GS to the EPS while maintaining the local offloading toward the local UPF anchor, according to some implementations of the present disclosure;

FIGS. 6A, 6B-1 through 6B-3, and FIGS. 6C-1 through 6C-3 are figures relating to control plane functionality for interacting with and using tunnel information of the UPF anchor, provisioned with one or more UL-CL rules for local offloading, for establishing the at least one bearer with the SGW for a handover from the 5GS to the EPS while maintaining the local offloading toward the local UPF anchor, according to some implementations of the present disclosure;

FIGS. 7A, 7B-1 through 7B-4, and FIGS. 7C-1 through 7C-3 are figures relating to control plane functionality for interacting with and using tunnel information of both a UPF anchor and a local UPF anchor for establishing bearers with the SGW for handover from the 5GS to the EPS while maintaining the local offloading toward local UPF anchor, according to some implementations of the present disclosure.

DESCRIPTION OF EXAMPLE EMBODIMENTS

Figure 1:
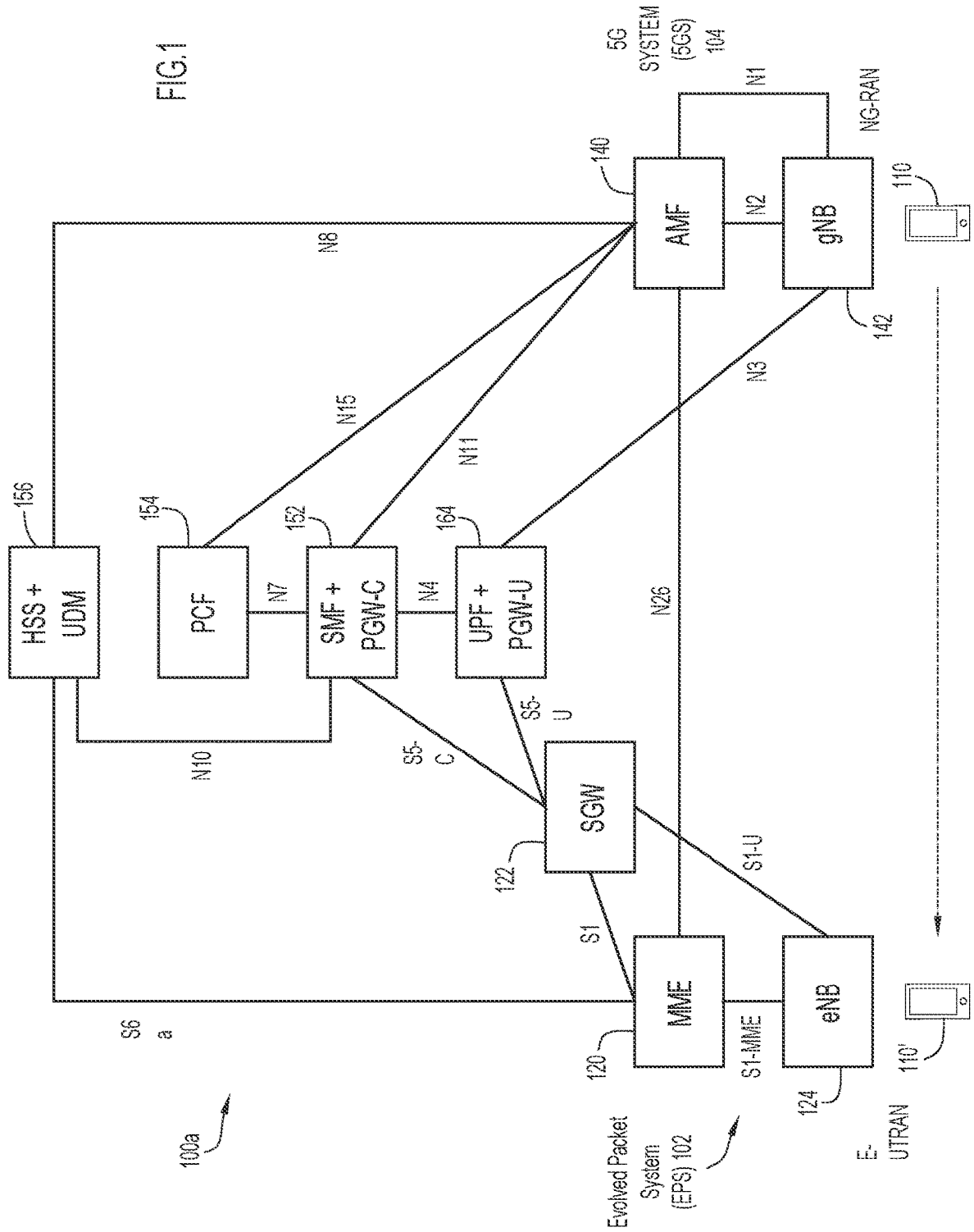
FIG. 1 is an illustrative representation of a Third Generation Partnership (3GPP) based mobile network having a non-roaming network architecture for interworking between an Evolved Packet System (EPS) and a Fifth Generation (5G) System (5GS)

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques and mechanisms for use in maintaining a local offloading of traffic in a handover of a session of a user equipment (UE) from a Fifth Generation System (5GS) to an Evolved Packet System (EPS) are described herein.

A network node may include control plane functionality for managing a session of a user equipment (UE) according to the present disclosure. In some implementations, the control plane functionality may be a Session Management Function (SMF) plus a Packet Data Network (PDN) Gateway Control Plane (PGW-C) (SMF+PGW-C) for interworking between the EPS and the 5GS. The EPS may include an Evolved Packet Core (EPC) with Control and User Plane Separation (CUPS) or non-CUPS architectures.

In one illustrative example, a UE may be registered with an Access and Mobility Management Function (AMF) of the 5GS, where a session of the UE is anchored at a User Plane Function (UPF) anchor for communicating traffic between the UE and a data network (DN). Sometime during operation, the AMF may request a session context from the SMF+PGW-C responsive to a handover indication indicating a handover of the session of the UE from the 5GS to the EPS. Here, the SMF+PGW-C may obtain, from the AMF, a session context request which is responsive to the handover indication. In response, the SMF+PGW-C may identify whether an uplink classifier (UL-CL) UPF is in use for a local offloading to a local UPF anchor for delivery to a local area data network (LADN). Based on identifying that the UL-CL UPF is in use for the local offloading, the SMF+PGW-C may obtain uplink tunnel information of the UL-CL UPF and send to the AMF a session context response including the uplink tunnel information of the UL-CL UPF. The sending of the session context response which includes the uplink tunnel information of the UL-CL UPF may cause the at least one bearer to be established between a Serving Gateway (SGW) (or more particularly, an SGW user plane or "SGW-U" in a CUPS architecture) and the UL-CL UPF, maintaining the local offloading of the local uplink traffic after the handover of the session from the 5GS to the EPS.

More detailed and alternative techniques and implementations are provided herein as described below.

EXAMPLE EMBODIMENTS

FIG. 1 is an illustrative representation of a Third Generation Partnership (3GPP) based mobile network 100a having a (non-roaming) network architecture for interworking between an Evolved Packet System (EPS) 102 and a Fifth Generation (5G) System (5GS) 104.

As shown in FIG. 1, EPS 102 of 3GPP-based mobile network 100a includes an Evolved Universal Terrestrial Radio Access Network (E-UTRAN) and an Evolved Packet Core (EPC). At least in some contexts, EPS 102 may be referred to as a Fourth Generation (4G) system. The E-UTRAN of FIG. 1 may be for Long-Term Evolution (LTE) based access, and may include one or more base stations such as an eNodeB (eNB) 124. The EPC of EPS 102 may include at least a Mobility Management Entity (MME) 120 and a Serving Gateway (SGW) 122. In some implementations, the EPC of EPS 102 may include a Control and User Plane Separation (CUPS) architecture, where SGW 122 is separated into a SGW Control Plane (SGW-C) and a SGW User Plane (SGW-U).

Further as shown in FIG. 1, the 5GS 104 of 3GPP-based mobile network 100a includes a Next-Generation (NG) RAN (NG-RAN) and a 5G Core (5GC). The NG-RAN is for 5G radio access, and may include one or more base stations such as a gNodeB (gNB) 142. The 5GC of 5GS 104 may include an Access and Mobility Management Function (AMF) 140 and a Policy Control Function (PCF) 154. As is apparent, different radio access technologies (RATs) and core functions are utilized between 4G and 5G. Note that standards for 5GS 104 are provided in 3GPP specifications, which include 3GPP Technical Specification (TS) 23.501 and 3GPP TS 23.502.

Interworking between 4G and 5G will play an important role in the deployment of 5G, which will rely on EPS 102 to be the "anchor" or underlying system. In a Standalone (SA) deployment of 5G, appropriate interworking with EPS 102 in order to facilitate mobility between the two different systems is essential.

For interworking between 5GS 104 and EPS 102, 3GPP-based mobile network 100a may include (interworking) user plane functionality, (interworking) control plane functionality for session management, and (interworking) subscriber data management functionality. The (interworking) user plane functionality may be or include a User Plane Function (UPF) plus a Packet Data Network (PDN) Gateway (GW) User Plane (PGW-U) (UPF+PGW-U) 164. The (interworking) control plane functionality for session management may be or include a Session Management Function (SMF) plus a PGW control plane (PGW-C) (SMF+PGW-C) 152. The (interworking) subscriber data management may be or include a Home Subscriber Server (HSS) plus a Unified Data Management (UDM) (HSS+UDM) 156.

Interfaces between the elements, functions, or modules in 3GPP-based mobile network 100a, such as interfaces for N1, N2, N3, N4, N7, N8, N10, N11, N15, N26 S1-MME, S1-U, S5-C, S5-U, and S6a, are described in relevant 3GPP specifications. In particular, the N26 interface between AMF 140 and MME 120 has been introduced to be an inter-core network (CN) interface for interworking between 5GS 104 and EPS 102.

A user equipment (UE) 110 is operative for communications in 3GPP-based mobile network 100a. More particularly, UE 110 may operate for communications in a selected one of EPS 102 (i.e. 4G) or 5GS 104. Here, UE 110 may be provided with radio access via the E-UTRAN (e.g. eNB 124) or the NG-RAN (e.g. gNB 142). In some implementations, UE 110 is configured to prioritize the selection of operation in 5GS 104 (i.e. prioritized over EPS 102) according to a preference or default setting, when 5G is available and configured. UE 110 may be any suitable type of device configured for communications, such as a cellular telephone, a smart phone, a tablet device, a gaming device or application, an Internet of Things (IoT) device, and a Machine-To-Machine (M2M) device, to name but a few.

In FIG. 1, UE 110 is shown to operate via the NG-RAN (e.g. gNB 142) in 5GS 104, but may subsequently need to (e.g. be required or forced to) communicate via the E-UTRAN (e.g. eNB 124) in EPS 102. Here, UE 110 may operate to switch communications to the E-UTRAN (e.g. eNB 124) in EPS 102 as a UE 110', for example, responsive to a relocation with 5G coverage loss or due to "EPS fallback" for a voice call.

EPS fallback may be commonplace in early 5G deployments, enabling the 5GS 104 to provide UE 110 with communications prior to all required voice configurations in UE 110 and/or the NG-RAN are completed (e.g. before the NG-RAN is dimensioned and tuned for voice). With EPS fallback, during call establishment for voice, communications of UE 110 may be switched from NR to LTE (i.e. 4G) to support suitable voice calls. Over time, when the required voice configurations in UE 110 and/or the NG-RAN are completed, Voice over New Radio (VoNR) calls in 5GS 104 will be permitted, and EPS fallback may be utilized less frequently or may not be necessary.

Two common scenarios for the handover of a session of UE 110 from 5GS 104 to EPS 102 will now be described in relation to FIGS. 2 and 3.

Figures 2, 5B:
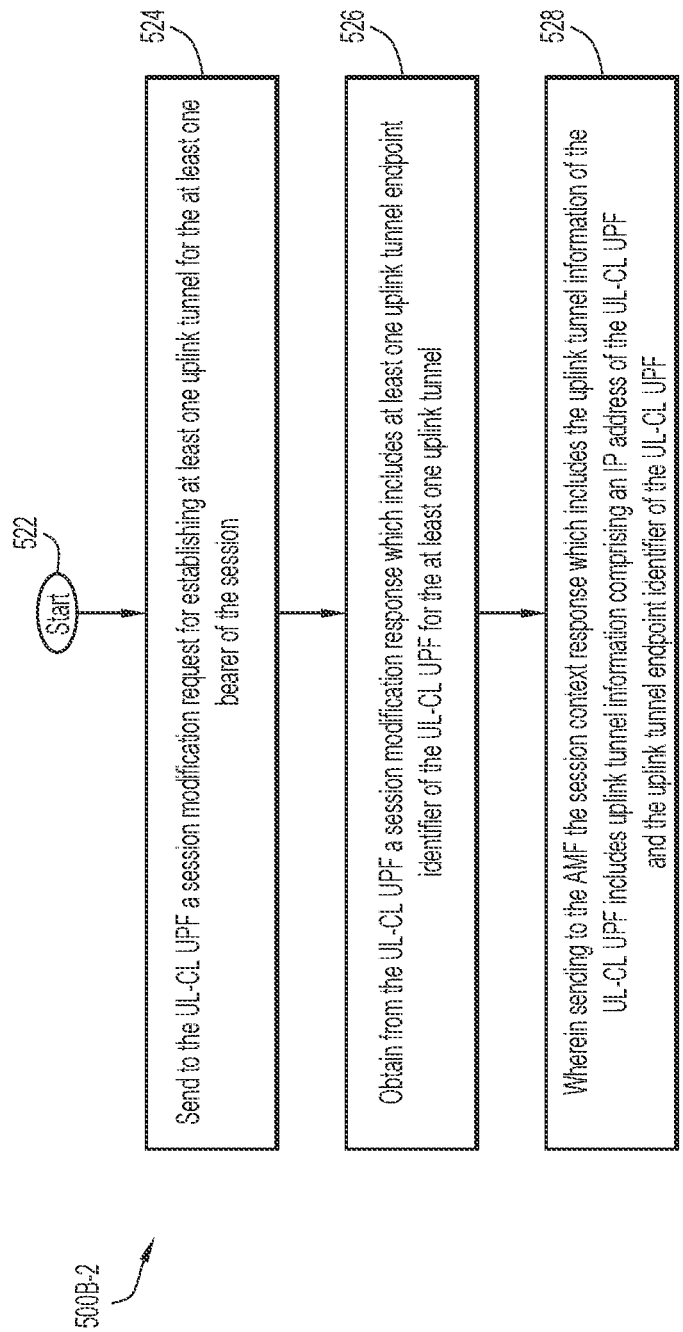
Figures 3, 5B:
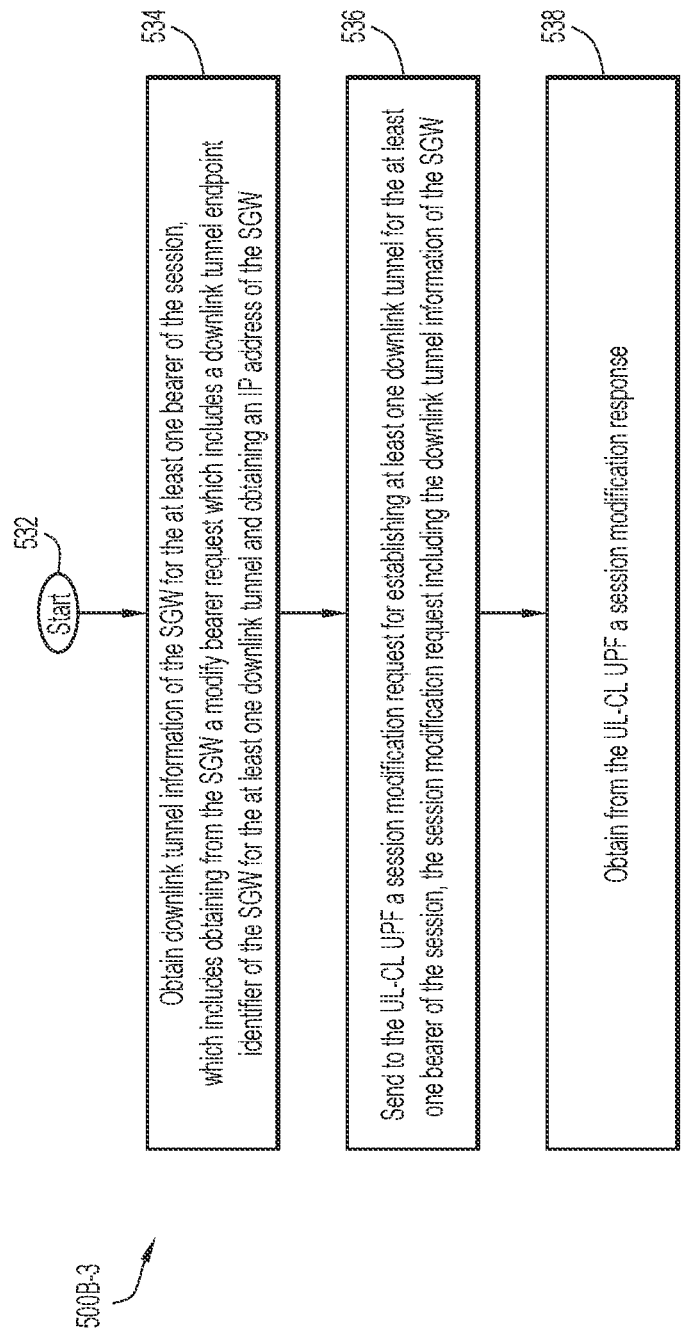

With reference to FIG. 2, an illustrative representation of a 3GPP-based mobile network 100b having the network architecture of FIG. 1 is shown, where a session 202 of UE 110 is anchored at a UPF anchor 160 for communicating traffic between UE 110 and a data network (DN) 170. AMF 140 may receive a handover indication indicating a handover of the session 202 of UE 110 from the 5GS to the EPS. In response, AMF 140 request from SMF+PGW-C 152 a session context for session 202. In response, SMF+PGW-C 152 may operate to establish a bearer between SGW 122 and UPF anchor 160 for facilitating the handover of session 202 from the 5GS to the EPS to a session 204, and provide the session context to AMF 140 for further bearer establishment. After handover of the session 202 of UE 110 from the 5GS to the EPS in a session 204, UE 110' communicates via eNB 124 and has a NAS connection with MME 120 for operation in the EPS.

Figure 3:
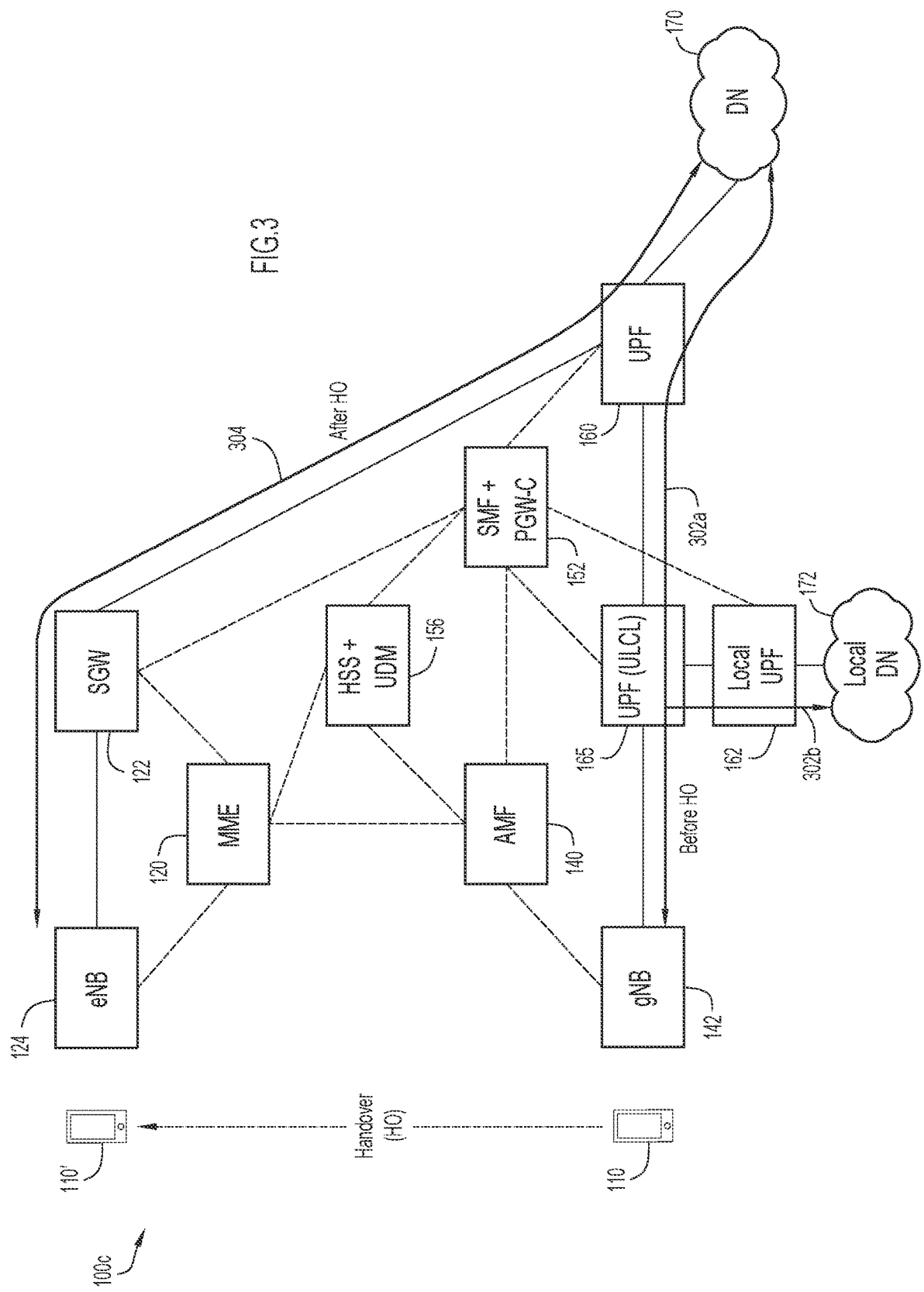
FIG. 3 is an illustrative representation of a 3GPP-based mobile network having the network architecture of FIGS. 1-2, where a session of the UE is anchored at the UPF anchor for communicating traffic between the UE and the data network, and where an uplink classifier (UL-CL) UPF is in use for a local offloading of a local uplink traffic towards a local UPF anchor for delivery to a local area data network (LADN)

With reference now to FIG. 3, an illustrative representation of a 3GPP-based mobile network 100c having the network architecture of FIGS. 1-2 is shown, where a session 302a of UE 110 is anchored at UPF anchor 160 for communicating traffic between UE 110 and data network 170. Here, 3GPP-based mobile network 100c may include a Multi-access Edge Compute (MEC) architecture, where an uplink classifier (UL-CL) UPF 165 is in use for a local offloading 302b of local uplink traffic towards a local UPF anchor 162 for delivery to a local area data network (LADN)

172. AMF 140 may receive a handover indication indicating a handover of the session 302a having the local offloading 302b from the 5GS to the EPS, and request from SMF+PGW-C 152 a session context for the session 302a. In response, SMF+PGW-C 152 may operate to establish a bearer between SGW 122 and UPF anchor 160 for facilitating the handover of the session 302a to the EPS in a session 304, and provide the session context to AMF 140 for further bearer establishment. After the handover, UE 110' communicates via eNB 124 and has a NAS connection with MME 120 for operation in EPS 102. However, the local offloading 302b of the local uplink traffic to local area data network 172 is now lost or removed, which is undesirable.

Techniques and mechanisms of the present disclosure relate to a handover of a session of UE 110 from 5GS 104 to EPS 102, especially for use in maintaining a local offloading of traffic in a handover of a session of UE 110 from 5GS 104 to EPS 102.

Figure 4:
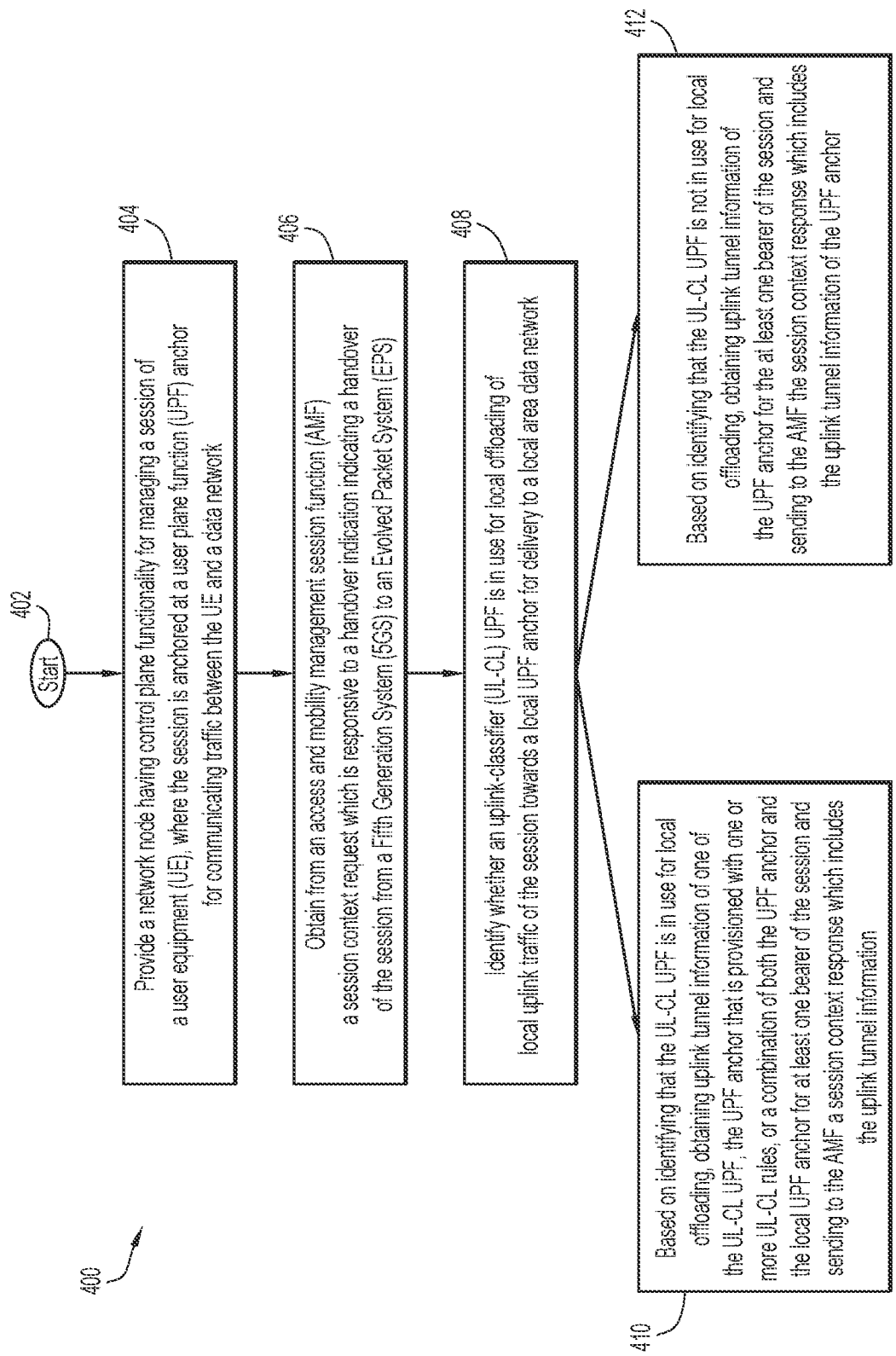
FIG. 4 is a flowchart for describing a method for use in managing a session of a UE for handover from the 5GS to the EPS according to some implementations of the present disclosure.

FIG. 4 is a flowchart 400 for describing a method for use in managing a session of a UE for handover from a 5GS to an EPS according to some implementations of the present disclosure. The method may be performed by a network node having control plane functionality for managing the session of the UE. In some implementations, the network node having the control plane functionality may be a network node having an SMF+PGW-C for use in interworking between the 5GS and the EPS. The method may be embodied in a computer program product which includes a non-transitory computer readable medium and instructions stored in the non-transitory computer readable medium, where the instructions are executable by one or more processors of the network node.

Beginning at a start block 402 of FIG. 4, a network node having control plane functionality for managing a session of a UE is provided (step 404 of FIG. 4). The network node may manage a session of a UE which is anchored at a UPF anchor for communicating traffic between the UE and a data network. During operation, the network node may obtain from an AMF a session context request for requesting a session context of the session of the UE (step 406 of FIG. 4). The session context request may be communicated in response to a handover indication (e.g. received or obtained at the AMF) indicating a handover of the session of the UE from the 5GS to the EPS. In response to obtaining the session context request, the network node may identify whether a UL-CL UPF is in use for a local offloading of local uplink traffic of the session, for example, towards a local UPF anchor for delivery to a local area data network (step 408 of FIG. 4).

Based on identifying that the UL-CL UPF is in use for the local offloading, the network node may obtain uplink tunnel information of one of the UL-CL UPF, the UPF anchor that is provisioned with one or more UL-CL rules, or a combination of both the UPF anchor and the local UPF anchor for the at least one bearer of the session, and then send to the AMF a session context response which includes the uplink tunnel information, for maintaining the local offloading of the local uplink traffic after the handover of the session from the 5GS to the EPS (step 410 of FIG. 4). The least one bearer of the session may be established with the SGW (or more specifically, the SGW-U in the CUPS architecture) of the EPS. In particular, the sending of the session context response which includes the uplink tunnel information may cause the at least one bearer to be established between the SGW and the one of the UL-CL UPF, the UPF anchor that is provisioned with the one or more UL-CL rules, or the combination of both the UPF anchor and the local UPF anchor.

On the other hand, based on identifying that the UL-CL UPF is not in use for the local offloading, the network node may obtain uplink tunnel information of the UPF anchor for the at least one bearer of the session and send to the AMF the session context response which includes the uplink tunnel information of the UPF anchor for the at least one bearer of the session (step 412 of FIG. 4). The sending of the session context response which includes the uplink tunnel information of the UPF anchor may cause the at least one bearer to be established between the SGW and the UPF anchor for the handover of the session from the 5GS to the EPS.

In some implementations of step 410 of FIG. 4, the network node may be configured to interact with and use tunnel information of the UL-CL UPF for establishing the at least one bearer with the SGW (or more specifically, the SGW-U in the CUPS architecture). Here, in some implementations, the network node may send to the UL-CL UPF a session modification request for establishing at least one uplink tunnel for the at least one bearer of the session, and obtain from the UL-CL UPF a session modification response which includes at least one uplink tunnel endpoint identifier of the UL-CL UPF for the at least one uplink tunnel. In step 408, the sending of the session context response which includes the uplink tunnel information may include uplink tunnel information comprising an IP address of the UL-CL UPF and the uplink tunnel endpoint identifier of the UL-CL UPF. Further in some implementations, the network node may obtain from the SGW a modify bearer request which includes a downlink tunnel endpoint identifier of the SGW, send to the UL-CL UPF a session modification request for establishing the at least one downlink tunnel for the at least one bearer of the session, and obtain from the UL-CL UPF a session modification response. The session modification request may include downlink tunnel information of the SGW which includes an IP address and the downlink tunnel endpoint identifier of the SGW. This approach is described in more detail in relation to FIGS. 5A, 5B-1 through 5B-3, and 5C-1 through 5C-3.

In some other implementations of step 410 of FIG. 4, the network node may be configured to interact with and use tunnel information of the UPF anchor that is provisioned with one or more UL-CL rules for local offloading for establishing the at least one bearer with the SGW (or more specifically, the SGW-U in the CUPS architecture). Here, in some implementations, the network node may send to the UPF anchor a session modification request for establishing at least one uplink tunnel for the at least one bearer of the session, where the session modification request includes the one or more UL-CL rules for provisioning the UPF anchor for the local offloading of local uplink traffic of the session towards the local UPF anchor for delivery to the local area data network. The network node may obtain from the UPF anchor that is provisioned with the one or more UL-CL rules a session modification response which includes at least one uplink tunnel endpoint identifier of the UPF anchor for the at least one uplink tunnel. In step 408, the sending of the session context response which includes the uplink tunnel information may include uplink tunnel information comprising an IP address and the uplink tunnel endpoint identifier of the UPF anchor that is provisioned with the one or more UL-CL rules. In further implementations, the network node may obtain from the SGW a modify bearer request which includes a downlink tunnel endpoint identifier of the SGW, send to the UPF anchor that is provisioned with the one or more UL-CL rules a session modification request for establishing the at least one downlink tunnel for the at least one bearer of the session, and then obtain from the UPF anchor that is provisioned with the one or more UL-CL rules a session modification response. The session modification request may include downlink tunnel information of the SGW which includes an IP address and the downlink tunnel endpoint identifier of the SGW. This approach is described in more detail in relation to FIGS. 6A, 6B-1 through 6B-3, and 6C-1 through 6C-3.

In even other implementations of step 410 of FIG. 4, the network node may be configured to interact with and use tunnel information of the combination of both the UPF anchor and the local UPF anchor for establishing the at least one bearer with the SGW (or more specifically, the SGW-U in the CUPS architecture). In some implementations, initially, traffic of the session for the local offloading is assigned to a new, separate Quality of Service (QoS) flow. Here, the network node may perform a session modification procedure for session modification involving the UPF anchor, for assigning a first portion of traffic to a first QoS flow that is separate from a second portion of traffic assigned to a second QoS flow. Then, the network node may perform an UL-CL insertion procedure for insertion of the UL-CL UPF, which includes provisioning the UL-CL UPF with one or more UL-CL rules for the local offloading of the local uplink traffic corresponding to the first portion of traffic that is assigned to the first QoS flow.

Then, in response to obtaining from the AMF the session context request which is responsive to the handover indication, the network node may send to the UPF anchor a first session modification request for establishing at least one first uplink tunnel for at least one first bearer, and then obtain from the UPF anchor a first session modification response which includes at least one first uplink tunnel endpoint identifier of the UPF anchor for the at least one first uplink tunnel. In addition, the network node may send to the local UPF anchor a second session modification request for establishing at least one second uplink tunnel for at least one second bearer, and obtain from the local UPF anchor a second session modification response which includes at least one second uplink tunnel endpoint identifier of the local UPF anchor for the at least one second uplink tunnel. The session context response which includes the uplink tunnel information may include uplink tunnel information comprising a first IP address of the UPF anchor and the first uplink tunnel endpoint identifier of the UPF anchor, as well as a second IP address of the local UPF anchor and the second uplink tunnel endpoint identifier of the local UPF anchor. The sending of the session context response which includes the uplink tunnel information may cause the at least the first bearer to be established between a SGW and the UPF anchor for communicating the second portion of traffic that is assigned to the second QoS flow, and may cause the at least the second bearer to be established between the SGW and the local UPF anchor for the local offloading of the local uplink traffic corresponding to the first portion of traffic that is assigned to the first QoS flow.

Subsequently, the network node may obtain from the SGW a modify bearer request which includes a first downlink tunnel endpoint identifier of the SGW and a second downlink tunnel endpoint identifier of the SGW. The network node may then send to the UPF anchor a first session modification request for establishing at least one first downlink tunnel for the at least one first bearer and obtain from the UPF anchor a first session modification response, where the first session modification request includes first downlink tunnel information of the SGW which includes an IP address and the first downlink tunnel endpoint identifier of the SGW for the at least one first downlink tunnel. The network node may then send to the local UPF anchor a second session modification request for establishing at least one second downlink tunnel for the at least one second bearer and obtain from the local UPF anchor a second session modification response, where second session modification request includes second downlink tunnel information of the SGW which includes the IP address and the second downlink tunnel endpoint identifier of the SGW for the at least one second downlink tunnel. The network node may then send to the SGW a modify bearer response. This approach is described in more detail in relation to FIGS. 7A, 7B-1 through 7B-4, and 7C-1 through 7C-3.

FIGS. 5A, 5B-1 through 5B-3, and FIGS. 5C-1 through 5C-3 are figures relating to control plane functionality for interacting with and using tunnel information of the UL-CL UPF for establishing the at least one bearer with the SGW (or more specifically, the SGW-U in the CUPS architecture) for the handover from the 5GS to the EPS, thereby maintaining the local offloading toward the local UPF anchor.

FIG. 5A is an illustrative representation of a 3GPP-based mobile network 500A having the network architecture of FIG. 1, where the SGW is shown separated into a SGW-U 122a and a SGW-C 122b according to the CUPS architecture. In FIG. 5A, a session 502a of UE 110 is anchored at UPF anchor 160 for communicating traffic between UE 110 and data network 170. 3GPP-based mobile network 500A may include an MEC architecture, where UL-CL UPF 165 is in use for a local offloading 502b of local uplink traffic towards local UPF anchor 162 for delivery to local area data network 172. Sometime during operation, AMF 140 may receive a handover indication indicating a handover of session 502a having the local offloading 502b from the 5GS to the EPS. In response, AMF 140 may request from SMF+PGW-C 152 a session context for session 502a having the local offloading 502b. In response, SMF+PGW-C 152 may operate to interact with and use tunnel information of UL-CL UPF 165 for establishing at least one bearer between SGW-U 122a and UL-CL UPF 165, and provide the session context to AMF 140 for further bearer establishment. The session 502a having the local offloading 502b is thereby handed over from the 5GS to the EPS to a session 504a having a local offloading 504b, where UE 110' communicates via eNB 124 with a NAS connection with MME 120 for operation in the EPS. Thus, the local offloading 504b of local uplink traffic for delivery to local area data network 172 is maintained after the handover to the EPS.

FIG. 5B-1 is a flowchart 500B-1 for describing a method for use in managing a session of a UE for handover from a 5GS to an EPS according to some implementations of the present disclosure. The method may be performed by a network node having control plane functionality for managing the session of the UE. In some implementations, the network node having the control plane functionality may be a network node having an SMF+PGW-C for use in interworking between the 5GS and the EPS. The method may be embodied in a computer program product which includes a non-transitory computer readable medium and instructions stored in the non-transitory computer readable medium, where the instructions are executable by one or more processors of the network node. In the method of FIG. 5B-1, when the UL-CL UPF is in use for the local offloading, the network node operates to interact with and use tunnel information of the UL-CL UPF for establishing the at least one bearer with the SGW (or more specifically, the SGW-U in the CUPS architecture) for the handover from the 5GS to the EPS, thereby maintaining the local offloading toward the local UPF anchor.

Beginning at a start block 502 of FIG. 5B-1, a network node having control plane functionality for managing a session of a UE is provided (step 504 of FIG. 5B-1). The network node may manage a session of a UE which is anchored at a UPF anchor for communicating traffic between the UE and a data network. During operation, the network node may obtain from an AMF a session context request for requesting a session context of the session of the UE (step 506 of FIG. 5B-1). The session context request may be communicated in response to a handover indication (e.g. received or obtained at the AMF) indicating a handover of the session of the UE from the 5GS to the EPS. In response to obtaining the session context request, the network node may identify whether a UL-CL UPF is in use for a local offloading of local uplink traffic of the session, for example, towards a local UPF anchor for delivery to a local area data network (step 508 of FIG. 5B-1).

Based on identifying that the UL-CL UPF is in use for the local offloading, the network node may obtain uplink tunnel information of the UL-CL UPF for the at least one bearer of the session, and then send to the AMF a session context response which includes the uplink tunnel information of the UL-CL UPF (step 510 of FIG. 5B-1). The least one bearer of the session may be established between the SGW and the UL-CL UPF. In particular, the sending of the session context response which includes the uplink tunnel information in step 510 of FIG. 5B-1 may cause the at least one bearer to be established between the SGW and the UL-CL UPF.

On the other hand, based on identifying that the UL-CL UPF is not in use for the local offloading, the network node may obtain uplink tunnel information of the UPF anchor for the at least one bearer of the session and send to the AMF the session context response which includes the uplink tunnel information of the UPF anchor for the at least one bearer of the session (step 512 of FIG. 5B-1). The sending of the session context response which includes the uplink tunnel information of the UPF anchor in step 512 of FIG. 5B-1 may cause the at least one bearer to be established between the SGW and the UPF anchor for the handover of the session from the 5GS to the EPS.

In step 510 of FIG. 5B-1, the network node interacts with and uses tunnel information of the UL-CL UPF (e.g. instead of the UPF anchor) for establishing the at least one bearer with the SGW (or more specifically, the SGW-U in the CUPS architecture). The method of FIG. 5B-1 may be continued in relation to FIGS. 5B-2 and 5B-3, which describe step 510 of FIG. 5B-1 in more detail.

Continuing the method with reference now to a flowchart 500B-2 of FIG. 5B-2, and beginning at a start block 522 of FIG. 5B-2, the network node may send to the UL-CL UPF a session modification request for establishing at least one uplink tunnel for the at least one bearer of the session (step 524 of FIG. 5B-2). The network node may then obtain from the UL-CL UPF a session modification response which includes at least one uplink tunnel endpoint identifier of the UL-CL UPF for the at least one uplink tunnel (step 526 of FIG. 5B-2). Accordingly, in step 510 of FIG. 5B-1, the sending of the session context response which includes the uplink tunnel information may include uplink tunnel information comprising an IP address of the UL-CL UPF and the uplink tunnel endpoint identifier of the UL-CL UPF (step 528 of FIG. 5B-2).

Further continuing the method with reference now to a flowchart 500B-3 of FIG. 5B-3, and beginning at a start block 532 of FIG. 5B-3, the network node may then obtain from the SGW a modify bearer request which includes a downlink tunnel endpoint identifier of the SGW (step 534 of FIG. 5B-3). The network node may then send to the UL-CL UPF a session modification request for establishing the at least one downlink tunnel for the at least one bearer of the session (step 536 of FIG. 5B-3). The session modification request may include downlink tunnel information of the SGW which includes an IP address of the SGW and the downlink tunnel endpoint identifier of the SGW. The network node may then obtain from the UL-CL UPF a session modification response (step 538 of FIG. 5B-3).

FIGS. 5C-1, 5C-2, and 5C-3 are diagrams 500C-1, 500C-2, and 500C-3 which form a call flow diagram for describing a call flow for managing a session of a UE for handover from a 5GS to an EPS according to some implementations of the present disclosure. The call flow diagram of FIGS. 5C-1, 5C-2, and 5C-3 corresponds to the method(s) of FIGS. 5B-1, 5B-2, and 5B-3, where the network node having the control plane functionality for session management operates to interact with and use tunnel information of UL-CL UPF 165 for establishing the at least one bearer with SGW 122 (or more specifically, the SGW-U in the CUPS architecture) for the handover from the 5GS to the EPS while maintaining the local offloading toward local UPF anchor 162.

Figures 1, 5C:
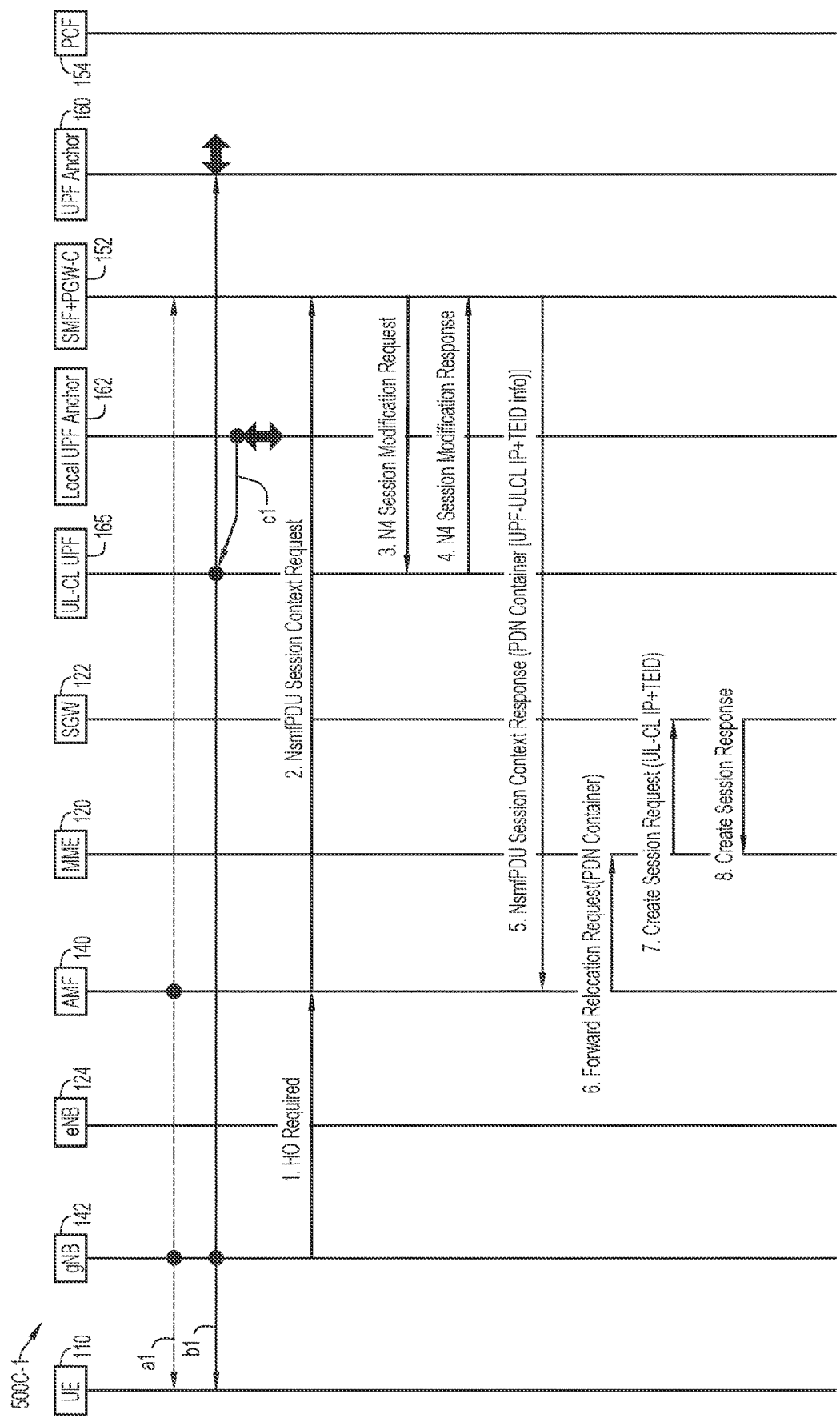
Figures 3, 5C:
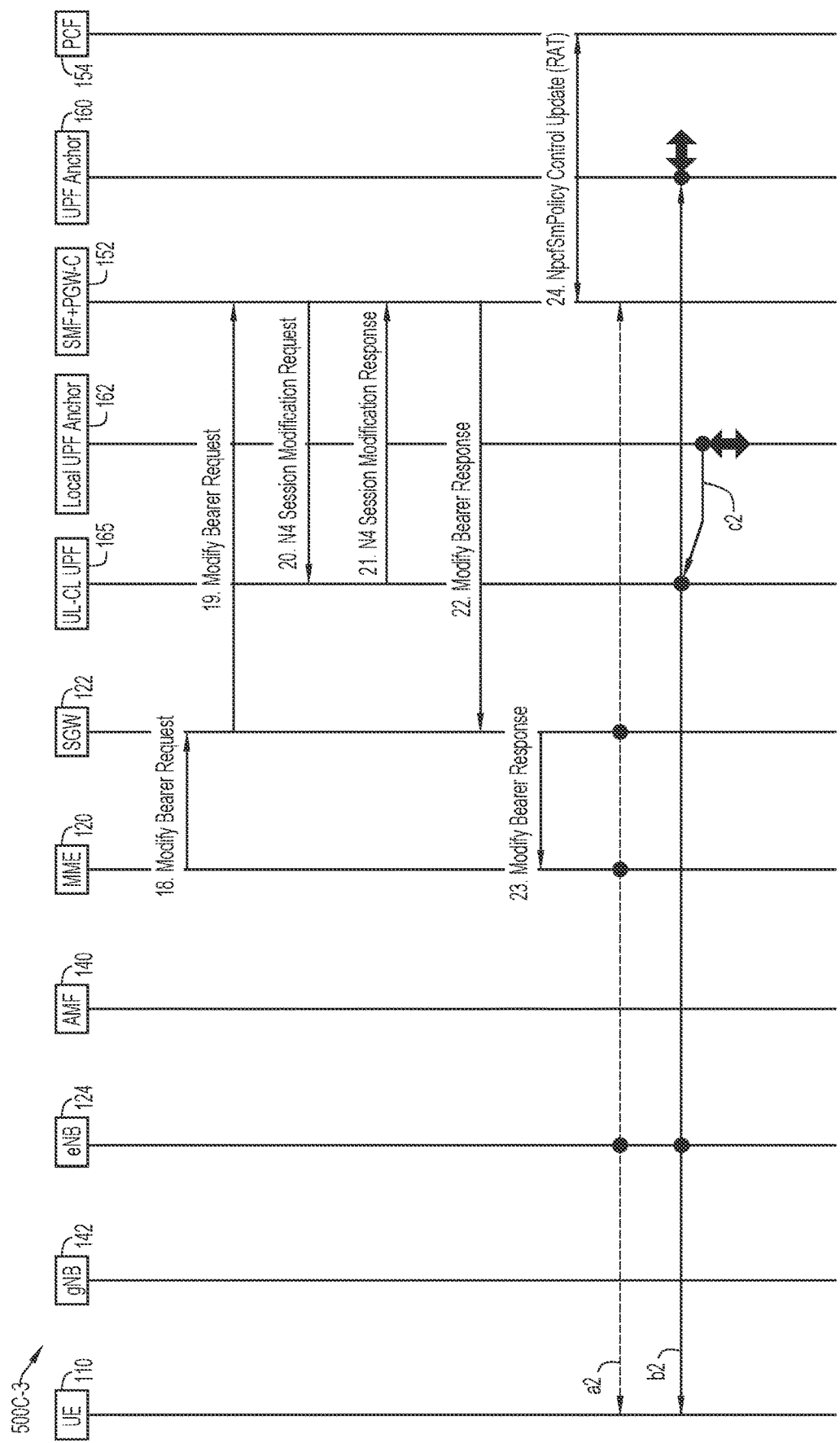

With reference to diagram 500C-1 of FIG. 5C-1, UE 110 is registered in the 5GS via gNB 142 with a session of UE 110 established for the communication of traffic. The session may be a Protocol Data Unit (PDU) session. For control plane signaling, AMF 140 operates for mobility management and SMF+PGW-C 152 operates for session management (see an indicator a1 of FIG. 5C-1). For the user plane, the session may be anchored at UPF anchor 160 for communicating traffic between UE 110 and a data network (see an indicator b1 of FIG. 5C-1). The mobile network may include an MEC architecture, where UL-CL UPF 165 is in use for a local offloading of local uplink traffic towards local UPF anchor 162 for delivery to a local area data network (see an indicator c1 of FIG. 5C-1). UP-CL UPF 165 may have been added by an UL-CL insertion procedure. See e.g. 3GPP specification, TS 23.502, clause 4.3.5.4, "Addition of additional PDU Session Anchor and Branching Point or UL CL."

Subsequently, a handover (HO) of the session from the 5GS to the EPS may be initiated (e.g. based on an indication of 5G coverage loss, or an indication of EPS fallback due to voice call, etc.). The gNB 142 may communicate to AMF 140 a message indicating HO required (step 1 of FIG. 5C-1). In response, AMF 140 may send to SMF+PGW-C 152 a message indicating a session context request for requesting a session context of the session of UE 110 (step 2 of FIG. 5C-1). More specifically, the session context request may be an Nsmf PDU Session Context Request. SMF+PGW-C 152 may receive the message and thereby obtain the session context request.

In response, SMF+PGW-C 152 may identify whether any UL-CL UPF is in use for the local offloading of local uplink traffic of the session. In the present scenario, SMF+PGW-C 152 identifies that UL-CL UPF 165 is in use for the local offloading of local uplink traffic towards local UPF anchor 162 for delivery to the local area data network. Based on identifying that UL-CL UPF 165 is in use for the local offloading, SMF+PGW-C 152 may interact with and use tunnel information of UL-CL UPF 165 (e.g. instead of UPF anchor 160) for establishing at least one bearer between SGW 122 and UL-CL UPF 165.

More particularly, SMF+PGW-C 152 may perform a session modification procedure with UL-CL UPF 165 for establishing a core network (CN) tunnel for each EPS bearer and provide EPS bearer contexts to AMF 140. See e.g. 3GPP specification, TS 23.502, clause 4.11.1.4.1, "EPS bearer ID allocation," step 8 in description of the figure. Here, SMF+ PGW-C 152 may obtain uplink tunnel information of UL-CL UPF 165. SMF+PGW-C 152 may send to UL-CL UPF 165 a message indicating a session modification request (step 3 of FIG. 5C-1). The session modification request may be for establishing at least one uplink tunnel for the at least one bearer of the session. UL-CL UPF 165 may send to SMF+PGW-C 152 a message indicating a session modification response (step 4 of FIG. 5C-1). The session modification response may include at least one uplink tunnel endpoint identifier of UL-CL UPF 165 for the at least one uplink tunnel. SMF+PGW-C 152 may receive the message and thereby obtain the session modification response. More specifically, the uplink tunnel endpoint identifier may be an uplink (UL) tunnel endpoint identifier (UL TED).

In response, SMF+PGW-C 152 may send to AMF 140 a message indicating a session context response which includes the uplink tunnel information of UL-CL UPF 165 (step 5 of FIG. 5C-1). The uplink tunnel information may include an IP address of UL-CL UPF 165 and the uplink tunnel endpoint identifier of UL-CL UPF 165. More specifically, the session context response may be an Nsmf PDU Session Context Response which has a Packet Data Network (PDN) Container including the IP address and the UL TEID of UL-CL UPF 165. Accordingly, for each bearer context for the PDN connection, the field "PGW S5/S8 IP Address and TEID for user plane" may contain the IP address and TEIDs allocated by UL-CL UPF 165 that were provided to SMF+ PGW-C in step 4 of FIG. 5C-1.

AMF 140 may receive the message and thereby obtain the session context response which includes the uplink tunnel information of UL-CL UPF 165. In response, AMF 140 may send to MME 120 a message indicating a forward relocation request (step 6 of FIG. 5C-1). The forward relocation request may include the PDN Container. In response, MME 120 may send to SGW 122 a message indicating a create session request (step 7 of FIG. 5C-1). The create session request may include the uplink tunnel information (e.g. the IP address and the UL TEID of UL-CL UPF 165) and be for establishing the at least one uplink tunnel for the at least one bearer of the session with SGW 122. SGW 122 may send to MME 120 a message indicating a create session response (step 8 of FIG. 5C-1).

The call flow in FIG. 5C-1 may be continued in FIGS. 5C-2 and 5C-3. With reference now to FIG. 5C-2, steps 9 through 17 may follow conventional message processing for 5GS to EPS handover as described in the 3GPP specifications. See e.g. 3GPP specification, TS 23.502, clause 4.11.1.2.1, "5GS to EPS handover using N26 interface," steps 6 through 13. In brief, in response to the create session response in step 8 of FIG. 5C-1, MME 120 may send to eNB 124 a message indicating a HO request (step 9 of FIG. 5C-2). The eNB 124 may receive and process the message, and send to MME 120 a message indicating a HO request acknowledgement message (step 10 of FIG. 5C-2). MME 120 may receive and process this message, and send to AMF 140 a message indicating a forward relocation response (step 11 of FIG. 5C-2). The forward relocation response may be provided to AMF 140 in response to the forward relocation request of step 6 of FIG. 5C-1. AMF 140 may send to gNB 142 a message indicating a HO command (step 12 of FIG. 5C-2) and, in response, the eNB 124 may send to UE 110 a message indicating a corresponding HO command (step 13 of FIG. 5C-2). UE 110 may receive this message and send to eNB 124 a message indicating a HO confirm (step 14 of FIG. 5C-2). The eNB 124 may send to MME 120 a message indicating a HO notify (step 15 of FIG. 5C-2). MME 120 may receive this message and, in response, send to AMF 140 a message indicating a forward relocation complete notification (step 16 of FIG. 5C-2). AMF 140 may receive this message and, in response, send to MME 120 a message indicating a forward relocation complete acknowledgement (step 17 of FIG. 5C-2).

With reference now to FIG. 5C-3, in response to receiving the message in step 17 of FIG. 5C-2, MME 120 may send to SGW 122 a message indicating a modify bearer request (step 18 of FIG. 5C-3). In response, SGW 122 may send to SMF+PGW-C 152 a message indicating a modify bearer request (step 19 of FIG. 5C-3). SMF+PGW-C 152 may receive the message and thereby obtain the modify bearer request. The modify bearer request may include a downlink tunnel endpoint identifier of SGW 122. More specifically, the downlink tunnel endpoint identifier may be a downlink (DL) TED.

In response, SMF+PGW-C 152 may send to UL-CL UPF 165 a message indicating a session modification request (step 20 of FIG. 5C-3). The session modification request may be for establishing the at least one downlink tunnel for the at least one bearer of the session and include downlink tunnel information of SGW 122. The downlink tunnel information may include an IP address of SGW 122 and the downlink tunnel endpoint identifier of SGW 122. UL-CL UPF 165 may receive and process the message, and in response, send to SMF+PGW-C 152 a message indicating a session modification response (step 21 of FIG. 5C-3). SMF+ PGW-C 152 may receive this message and thereby obtain the session modification response. In response, SMF+ PGW-C 152 may send to SGW 122 a message indicating a modify bearer response (step 22 of FIG. 5C-3). SGW 122 may receive and process the message, and in response, send to MME 120 a message indicating a modify bearer response (step 23 of FIG. 5C-3). SMF+PGW-C 152 may perform a policy control update with PCF 154 to inform PCF 154 of a change in a radio access type (RAT) type due to the handover (step 24 of FIG. 5C-3). More specifically, the policy control update may be an Npcf Sm Policy Control Update.

The handover of the session of UE 110 from the 5GS to the EPS is now complete. UE 110 communicates in the session for the communication of traffic via eNB 124 of the EPS. Now, for control plane signaling, UE 110 has a Non-Access Stratum (NAS) connection with MME 120, where MME 120 operates for mobility management and SGW 122 (e.g. the SGW-C) operates for session management (see an indicator a2 of FIG. 5C-3). For the user plane, the session may be anchored at UPF anchor 160 for communicating traffic between UE 110 and the data network (see an indicator b2 of FIG. 5C-3), where UL-CL UPF 165 is maintained for the local offloading of local uplink traffic towards local UPF anchor 162 for delivery to the local area data network (see an indicator c2 of FIG. 5C-3).

FIGS. 6A, 6B-1 through 6B-3, and FIGS. 6C-1 through 6C-3 are figures relating to control plane functionality for interacting with and using tunnel information of UPF anchor 160, provisioned with one or more UL-CL rules for a local offloading, for establishing at least one bearer with the SGW (or more specifically, the SGW-U in the CUPS architecture)

for the handover from the 5GS to the EPS, thereby maintaining the local offloading toward the local UPF anchor.

FIG. 6A is an illustrative representation of a 3GPP-based mobile network 600A having the network architecture of FIG. 1, where a session 602a of UE 110 is anchored at UPF anchor 160 for communicating traffic between UE 110 and data network 170. 3GPP-based mobile network 600A may include an MEC architecture, where UL-CL UPF 165 is in use for a local offloading 602b of local uplink traffic towards local UPF anchor 162 for delivery to local area data network 172. Sometime during operation, AMF 140 may receive a handover indication indicating a handover of session 602a having the local offloading 602b from the 5GS to the EPS. In response, AMF 140 may request from SMF+PGW-C 152 a session context for session 602a having the local offloading 602b. In response, SMF+PGW-C 152 may operate to interact with and use tunnel information of UPF anchor 160, provisioned with one or more UL-CL rules for the local offloading, for establishing at least one bearer between SGW 122 and UPF anchor 160, and provide the session context to AMF 140 for further bearer establishment. The session 602a having the local offloading 602b is thereby handed over from the 5GS to the EPS to a session 604a having a local offloading 604b, where UE 110' communicates via eNB 124 and has a NAS connection with MME 120 for operation in the EPS. Thus, the local offloading 604b of local uplink traffic towards local UPF anchor 162 for delivery to local area data network 172 is maintained after the handover to the EPS.

Figures 1, 6B:
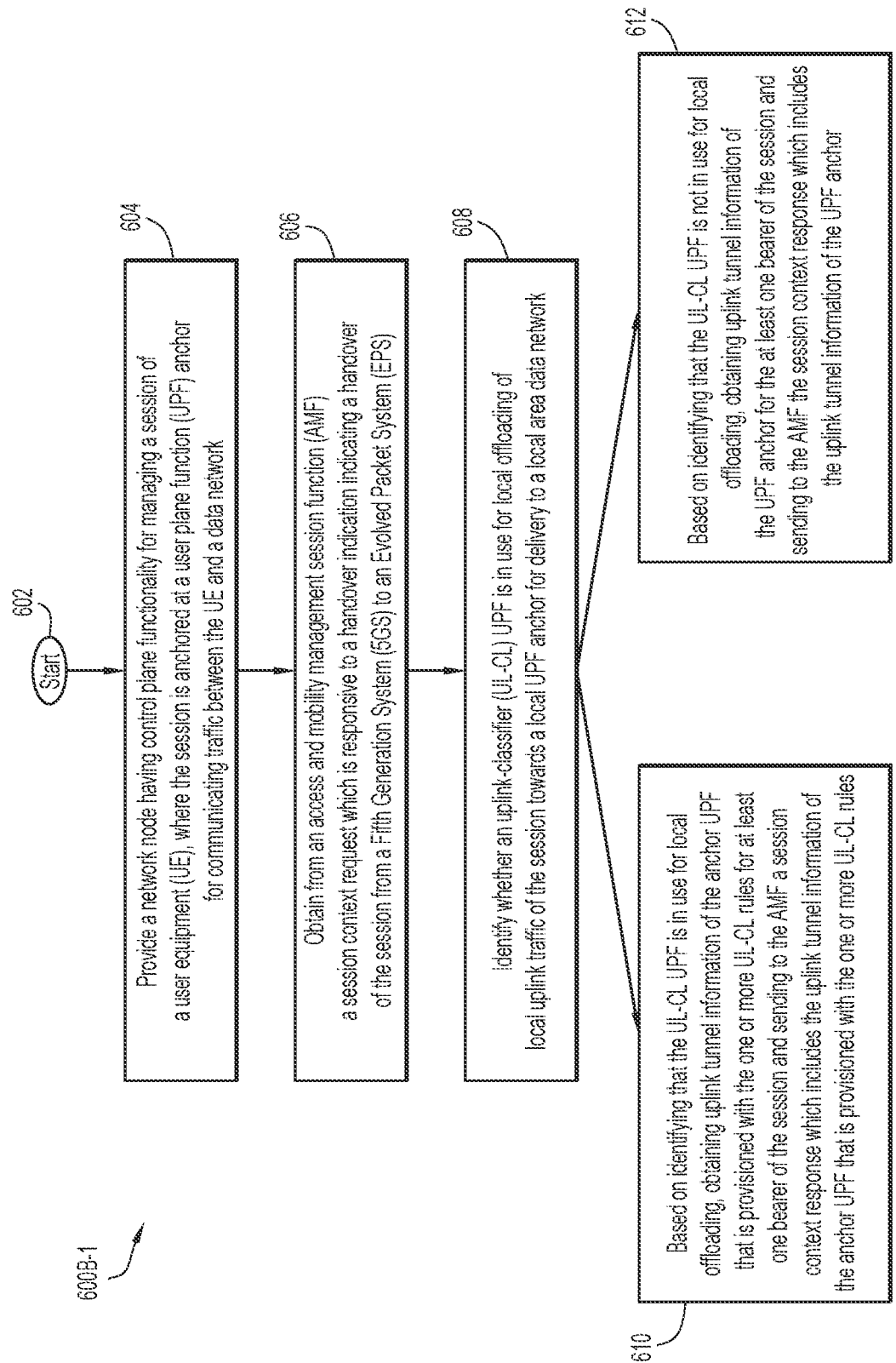

FIG. 6B-1 is a flowchart 600B-1 for describing a method for use in managing a session of a UE for handover from a 5GS to an EPS according to some implementations of the present disclosure. The method may be performed by a network node having control plane functionality for managing the session of the UE. In some implementations, the network node having the control plane functionality may be a network node having an SMF+PGW-C for use in interworking between the 5GS and the EPS. The method may be embodied in a computer program product which includes a non-transitory computer readable medium and instructions stored in the non-transitory computer readable medium, where the instructions are executable by one or more processors of the network node. In the method of FIG. 6B-1, when the UL-CL UPF is in use for the local offloading, the network node operates to interact with and use tunnel information of the UPF anchor, provisioned with one or more UL-CL rules for the local offloading, for establishing the at least one bearer with the SGW (or more specifically, the SGW-U in the CUPS architecture) for the handover from the 5GS to the EPS, thereby maintaining the local offloading toward the local UPF anchor.

Beginning at a start block 602 of FIG. 6B-1, a network node having control plane functionality for managing a session of a UE is provided (step 604 of FIG. 6B-1). The network node may manage a session of a UE which is anchored at a UPF anchor for communicating traffic between the UE and a data network. During operation, the network node may obtain from an AMF a session context request for requesting a session context of the session of the UE (step 606 of FIG. 6B-1). The session context request may be communicated in response to a handover indication (e.g. received or obtained at the AMF) indicating a handover of the session of the UE from the 5GS to the EPS. In response to obtaining the session context request, the network node may identify whether a UL-CL UPF is in use for a local offloading of local uplink traffic of the session, for example, towards a local UPF anchor for delivery to a local area data network (step 608 of FIG. 6B-1).

Based on identifying that the UL-CL UPF is in use for the local offloading, the network node may obtain uplink tunnel information of the UPF anchor, provisioned with one or more UL-CL rules for the local offloading of local uplink traffic, and send to the AMF a session context response which includes the uplink tunnel information of the UPF anchor that is provisioned with the one or more UL-CL rules (step 610 of FIG. 6B-1). The least one bearer of the session may be established between the SGW and the UPF anchor that is provisioned with one more UL-CL rules. In particular, the sending of the session context response which includes the uplink tunnel information in step 610 of FIG. 6B-1 may cause the at least one bearer to be established between the SGW and the UPF anchor that is provisioned with the one more UL-CL rules for the local offloading.

On the other hand, based on identifying that the UL-CL UPF is not in use for the local offloading, the network node may obtain uplink tunnel information of the UPF anchor (without provisioned UL-CL rules) for the at least one bearer of the session and send to the AMF the session context response which includes the uplink tunnel information of the UPF anchor for the at least one bearer of the session (step 612 of FIG. 6B-1). The sending of the session context response in step 612 of FIG. 6B-1 which includes the uplink tunnel information of the UPF anchor may cause the at least one bearer to be established between the SGW and the UPF anchor for the handover of the session from the 5GS to the EPS.

In step 610 of FIG. 6B-1, the network node interacts with and uses tunnel information of the UPF anchor that is provisioned with one or more UL-CL rules (e.g. instead of just the UPF anchor) for establishing the at least one bearer with the SGW (or more specifically, the SGW-U in the CUPS architecture). The method of FIG. 6B-1 may be continued in relation to FIGS. 6B-2 and 6B-3, which describe step 610 of FIG. 6B-1 in more detail.

Continuing the method with reference now to a flowchart 600B-2 of FIG. 6B-2, and beginning at a start block 622 of FIG. 6B-2, the network node may send to the UPF anchor a session modification request for establishing at least one uplink tunnel for the at least one bearer of the session (step 624 of FIG. 6B-2). The session modification request may include the one or more UL-CL rules for provisioning the UPF anchor for the local offloading of local uplink traffic of the session, for example, towards the local UPF anchor for delivery to the local area data network. The network node may then obtain from the UPF anchor that is provisioned with the one or more UL-CL rules a session modification response which includes at least one uplink tunnel endpoint identifier of the UPF anchor for the at least one uplink tunnel (step 626 of FIG. 6B-2). Accordingly, in step 610 of FIG. 6B-1, the sending of the session context response which includes the uplink tunnel information may include uplink tunnel information comprising an IP address and the uplink tunnel endpoint identifier of the UPF anchor that is provisioned with the one or more UL-CL rules (step 628 of FIG. 6B-2).

Further continuing the method with reference now to a flowchart 600B-3 of FIG. 6B-3, and beginning at a start block 632 of FIG. 6B-3, the network node may then obtain from the SGW a modify bearer request which includes a downlink tunnel endpoint identifier of the SGW (step 634 of FIG. 6B-3). The network node may then send to the UPF anchor that is provisioned with the one or more UL-CL rules a session modification request for establishing the at least one downlink tunnel for the at least one bearer of the session (step 636 of FIG. 6B-3). The session modification request may include downlink tunnel information of the SGW which includes an IP address of the SGW and the downlink tunnel endpoint identifier of the SGW. The network node may then obtain from the UPF anchor that is provisioned with the one or more UL-CL rules a session modification response (step 638 of FIG. 6B-3).

FIGS. 6C-1, 6C-2, and 6C-3 are diagrams 600C-1, 600C-2, and 600C-3 which form a call flow diagram for describing a call flow for managing a session of a UE for handover from the 5GS to the EPS according to some implementations of the present disclosure. The call flow diagram of FIGS. 6C-1, 6C-2, and 6C-3 corresponds to the method(s) of FIGS. 6B-1, 6B-2, and 6B-3, where the network node having the control plane functionality for session management operates to interact with and use tunnel information of UPF anchor 160 that is provisioned with one or more UL-CL rules for establishing the at least one bearer with SGW 122 (or more specifically, the SGW-U in the CUPS architecture) for the handover from the 5GS to the EPS while maintaining the local offloading toward local UPF anchor 162.

Figures 1, 6C:
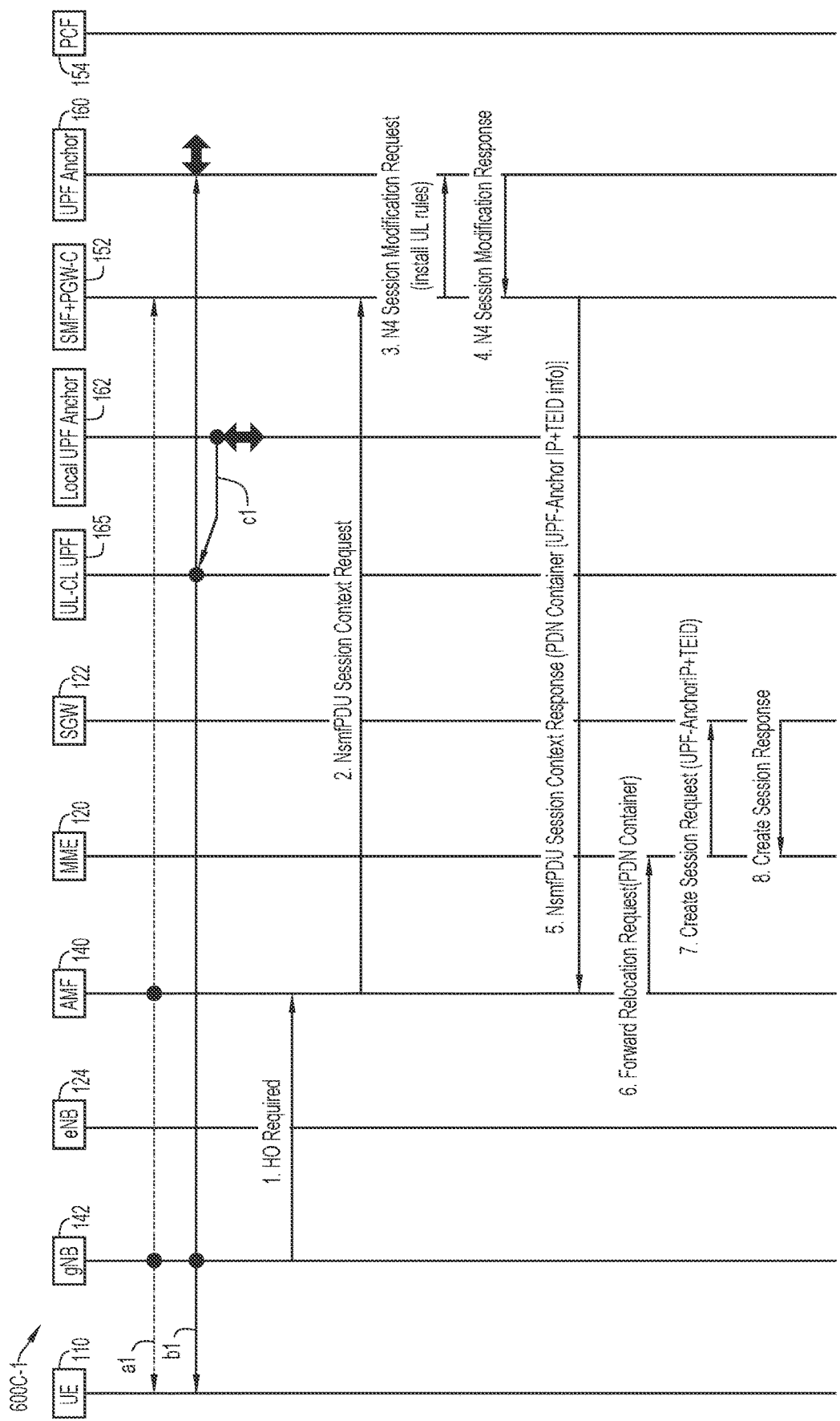
Figures 2, 6C:
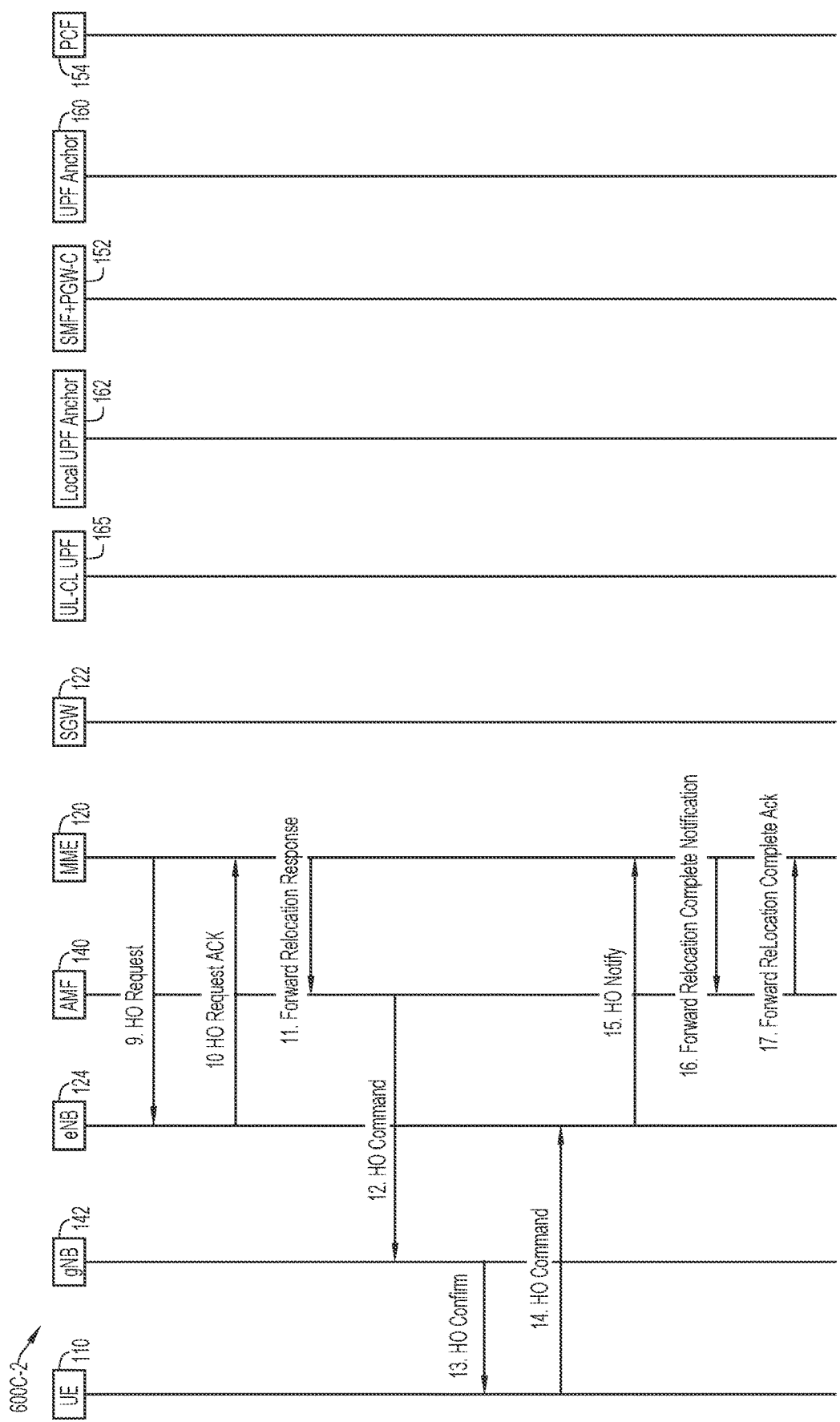
Figures 3, 6C:
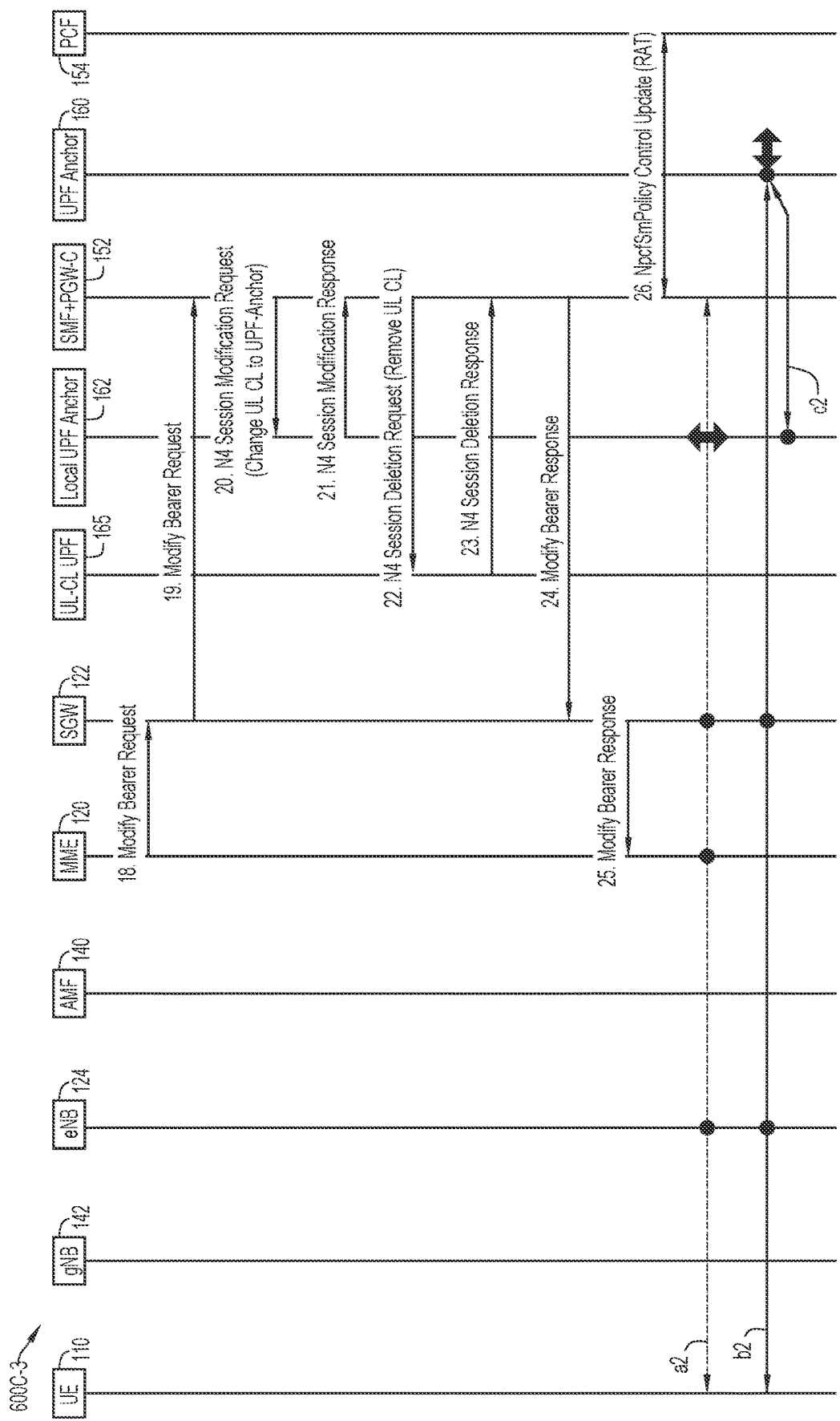

With reference to diagram 600C-1 of FIG. 6C-1, UE 110 is registered in the 5GS via gNB 142 with a session of UE 110 established for the communication of traffic. The session may be a PDU session. For control plane signaling, AMF 140 operates for mobility management and SMF+PGW-C 152 operates for session management (see an indicator a1 of FIG. 6C-1). For the user plane, the session may be anchored at UPF anchor 160 for communicating traffic between UE 110 and a data network (see an indicator b1 of FIG. 6C-1). The mobile network may include an MEC architecture, where UL-CL UPF 165 is in use for the local offloading of local uplink traffic towards local UPF anchor 162 for delivery to a local area data network (see an indicator c1 of FIG. 6C-1). UL-CL UPF 165 may have been added by an UL-CL insertion procedure. See e.g. 3GPP specification, TS 23.502, clause 4.3.5.4, "Addition of additional PDU Session Anchor and Branching Point or UL CL."

Subsequently, a HO of the session from the 5GS to the EPS may be initiated (e.g. based on an indication of 5G coverage loss, or an indication of EPS fallback due to voice call, etc.). The gNB 142 may communicate to AMF 140 a message indicating HO required (step 1 of FIG. 6C-1). In response, AMF 140 may send to SMF+PGW-C 152 a message indicating a session context request for requesting a session context of the session of UE 110 (step 2 of FIG. 6C-1). More specifically, the session context request may be an Nsmf PDU Session Context Request. SMF+PGW-C 152 may receive the message and thereby obtain the session context request.

In response, SMF+PGW-C 152 may identify whether any UL-CL UPF is in use for the local offloading of local uplink traffic of the session. In the present scenario, SMF+PGW-C 152 identifies that UL-CL UPF 165 is in use for the local offloading of local uplink traffic towards local UPF anchor 162 for delivery to the local area data network. Based on identifying that UL-CL UPF 165 is in use for the local offloading, SMF+PGW-C 152 may interact with and use tunnel information of UPF anchor 160 that is provisioned with the one or more UL-CL rules for the local offloading (e.g. instead of just UPF anchor 160) for establishing at least one bearer between SGW 122 and UPF anchor 160 that is provisioned with the one or more UL-CL rules for the local offloading.

Initially, SMF+PGW-C 152 may obtain uplink tunnel information of UPF anchor 160. SMF+PGW-C 152 may send to UPF anchor 160 a message indicating a session modification request (step 3 of FIG. 6C-1). The session modification request may be for establishing at least one uplink tunnel for the at least one bearer of the session. The session modification request may include the one or more UL-CL rules for provisioning UPF anchor 160 for the local offloading of local uplink traffic of the session, for example, towards local UPF anchor 162 for delivery to the local area data network. UPF anchor 160 that is provisioned with the one or more UL-CL rules may send to SMF+PGW-C 152 a message indicating a session modification response (step 4 of FIG. 6C-1). The session modification response may include at least one uplink tunnel endpoint identifier (e.g. the UL TED) of UPF anchor 160 that is provisioned with the one or more UL-CL rules for the at least one uplink tunnel. SMF+PGW-C 152 may receive the message and thereby obtain the session modification response.

In response, SMF+PGW-C 152 may send to AMF 140 a message indicating a session context response which includes the uplink tunnel information of UPF anchor 160 that is provisioned with the one or more UL-CL rules (step 5 of FIG. 6C-1). The uplink tunnel information may include an IP address and the uplink tunnel endpoint identifier of UPF anchor 160 that is provisioned with the one or more UL-CL rules. More specifically, the session context response may be an Nsmf PDU Session Context Response having a PDN Container including the IP address and the UL TEID of UPF anchor 160 that is provisioned with the one or more UL-CL rules. Accordingly, for each bearer context for the PDN connection, the field "PGW S5/S8 IP Address and TED for user plane" may contain the IP address and TEIDs provided by UPF anchor 160 that were provided to SMF+PGW-C in step 4 of FIG. 6C-1.

AMF 140 may receive the message and thereby obtain the session context response which includes the uplink tunnel information of UPF anchor 160 that is provisioned with the one or more UL-CL rules. In response, AMF 140 may send to MME 120 a message indicating a forward relocation request (step 6 of FIG. 6C-1). The forward relocation request may include the PDN Container. In response, MME 120 may send to SGW 122 a message indicating a create session request (step 7 of FIG. 6C-1). The create session request may include the uplink tunnel information (e.g. the IP address and the UL TED of UPF anchor 160 that is provisioned with the one or more UL-CL rules) and be for establishing the at least one uplink tunnel for the at least one bearer of the session with SGW 122. SGW 122 may send to MME 120 a message indicating a create session response (step 8 of FIG. 6C-1).

The call flow in FIG. 6C-1 may be continued in FIGS. 6C-2 and 6C-3. With reference now to FIG. 6C-2, again steps 9 through 17 may follow conventional message processing for 5GS to EPS handover as described in the 3GPP specifications. See e.g. 3GPP specification, TS 23.502, clause 4.11.1.2.1, "5GS to EPS handover using N26 interface," steps 6 through 13. In brief, in response to the create session response in step 8 of FIG. 6C-1, MME 120 may send to the eNB 124 a message indicating a HO request (step 9 of FIG. 6C-2). The eNB 124 may receive and process the message, and send to MME 120 a message indicating a HO request acknowledgement message (step 10 of FIG. 6C-2). MME 120 may receive and process this message, and send to AMF 140 a message indicating a forward relocation response (step 11 of FIG. 6C-2). The forward relocation response may be provided to AMF 140 in response to the forward relocation request of step 6 of FIG. 6C-1. AMF 140 may send to gNB 142 a message indicating a HO command (step 12 of FIG. 5C-2) and, in response, gNB 142 may send to UE 110 a message indicating a corresponding HO command (step 13 of FIG. 6C-2). UE 110 may receive this message and send to eNB 124 a message indicating a HO confirm (step 14 of FIG. 6C-2). The eNB 124 may send to MME 120 a message indicating a HO notify (step 15 of FIG. 6C-2). MME 120 may receive this message and, in response, send to AMF 140 a message indicating a forward relocation complete notification (step 16 of FIG. 6C-2). AMF 140 may receive this message and, in response, send to MME 120 a message indicating a forward relocation complete acknowledgement (step 17 of FIG. 6C-2).

With reference now to FIG. 6C-3, in response to receiving the message in step 17 of FIG. 6C-2, MME 120 may send to SGW 122 a message indicating a modify bearer request (step 18 of FIG. 6C-3). In response, SGW 122 may send to SMF+PGW-C 152 a message indicating a modify bearer request (step 19 of FIG. 6C-3). SMF+PGW-C 152 may receive the message and thereby obtain the modify bearer request. The modify bearer request may include a downlink tunnel endpoint identifier (e.g. a DL TEID) of SGW 122.

In response, SMF+PGW-C 152 may send to local UPF anchor 162 a message indicating a session modification request (step 20 of FIG. 6C-3). The session modification request may be for establishing the at least one downlink tunnel for the at least one bearer of the session and include downlink tunnel information of UPF anchor 160. The downlink tunnel information may include an IP address of UPF anchor 160 and the downlink tunnel endpoint identifier of UPF anchor 160. Local UPF anchor 162 may receive and process the message, and in response, send to SMF+PGW-C 152 a message indicating a session modification response (step 21 of FIG. 6C-3). SMF+PGW-C 152 may receive this message and thereby obtain the session modification response. SMF-PGW-C 152 may perform a session deletion procedure with UL-CL UPF 165, for removing the UL-CL from use. Here, SMF-PGW-C 152 may send to UL-CL UPF 165 a message indicating a session deletion request (e.g. for removing the UL-CL) (step 22 of FIG. 6C-3), and receive from UL-CL UPF 165 a message indicating a session deletion response (step 23 of FIG. 6C-3). SMF+PGW-C 152 may then send to SGW 122 a message indicating a modify bearer response (step 24 of FIG. 6C-3). SGW 122 may receive and process the message, and in response, send to MME 120 a message indicating a modify bearer response (step 25 of FIG. 6C-3). SMF+PGW-C 152 may perform a policy control update with PCF 154 to inform PCF 154 of a change in RAT type due to the handover (step 26 of FIG. 6C-3). More specifically, the policy control update may be an Npcf Sm Policy Control Update.

The handover of the session of UE 110 from the 5GS to the EPS is now complete. UE 110 communicates in the session for the communication of traffic via eNB 124 of the EPS. Now, for control plane signaling, UE 110 has a NAS connection with MME 120, where MME 120 operates for mobility management and SGW 122 (e.g. the SGW-C) operates for session management (see an indicator a2 of FIG. 6C-3). For the user plane, the session may be anchored at UPF anchor 160 for communicating traffic between UE 110 and the data network (see an indicator b2 of FIG. 6C-3), where UPF anchor 160 includes the one or more UL-CL rules for the local offloading of local uplink traffic towards local UPF anchor 162 for delivery to the local area data network (see an indicator c2 of FIG. 6C-3).

FIGS. 7A, 7B-1 through 7B-4, and FIGS. 7C-1 through 7C-3 are figures relating to control plane functionality for interacting with and using tunnel information of a combination of both the UPF anchor and the local UPF anchor for establishing bearers with the SGW (or more specifically, the SGW-U in the CUPS architecture) for the handover from the 5GS to the EPS, thereby maintaining the local offloading toward the local UPF anchor.

Figure 7A:
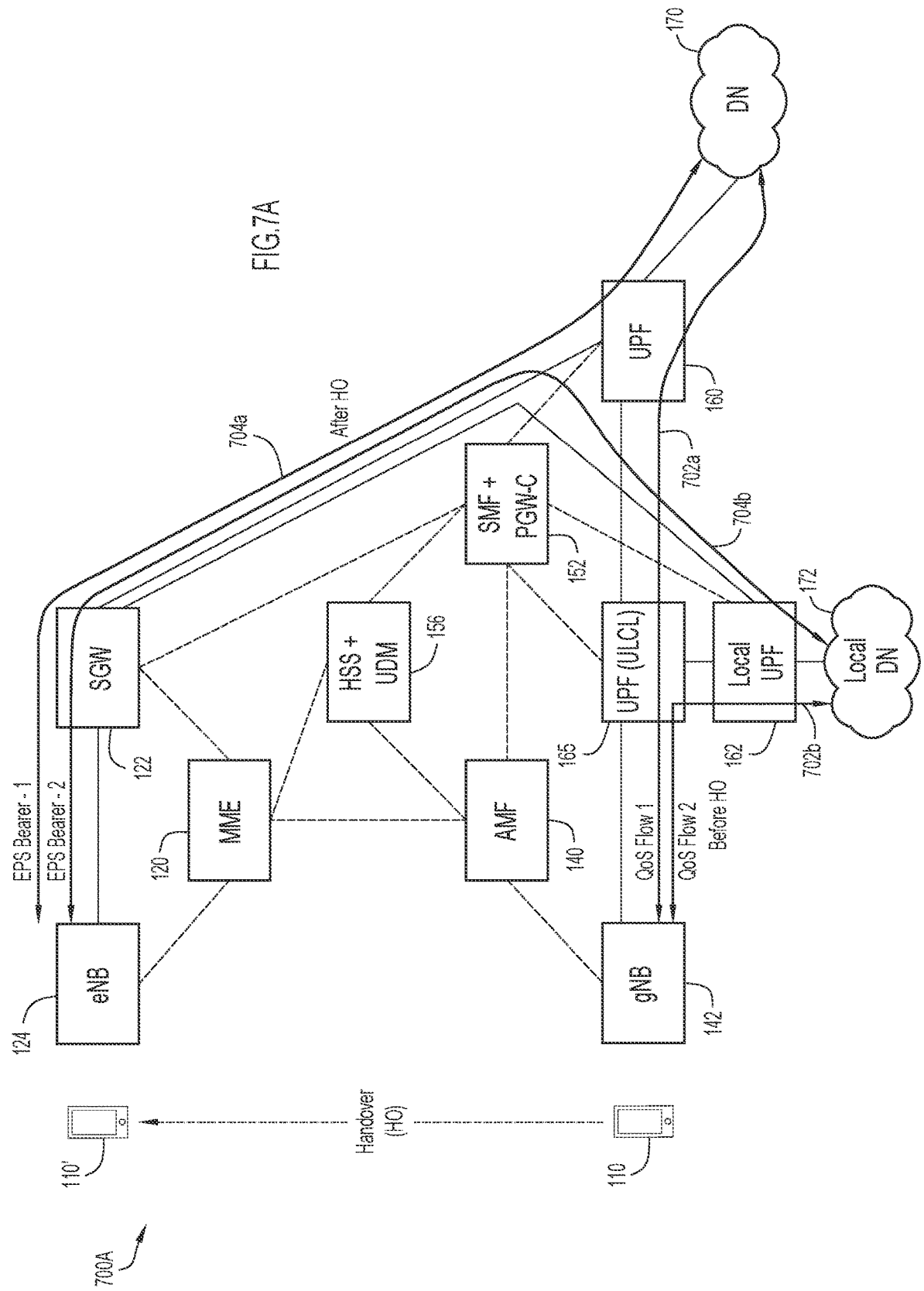

FIG. 7A is an illustrative representation of a 3GPP-based mobile network 700A having the network architecture of FIG. 1, where a session 702a of UE 110 is anchored at UPF anchor 160 for communicating traffic between UE 110 and data network 170. 3GPP-based mobile network 700A may include an MEC architecture, where UL-CL UPF 165 is in use for a local offloading 702b of a local uplink traffic towards local UPF anchor 162 for delivery to local area data network 172. Here, a first portion of traffic of UE 110 is assigned to a first QoS flow for the local offloading 702b and a second portion of traffic is assigned to a second QoS flow for non-local offloading. Sometime during operation, AMF 140 may receive a handover indication indicating a handover of session 702a having the local offloading 702b from the 5GS to the EPS. In response, AMF 140 may request from SMF+PGW-C 152 a session context of session 702a having the local offloading 702b. In response, SMF+PGW-C 152 may operate to interact with and use tunnel information of a combination of both UPF anchor 160 and local UPF anchor 162 for establishing bearers with SGW 122, and provide the session context to AMF 140 for further bearer establishment. The session 702a having the local offloading 702b is thereby handed over from the 5GS to the EPS to a session 704a and a session 704b for the local offloading, where UE 110' communicates via eNB 124 and has a NAS connection with MME 120 for operation in the EPS. Thus the local offloading in session 704b of local uplink traffic towards local UPF anchor 162 for delivery to local area data network 172 is maintained after the handover to the EPS.

Figures 1, 7B:
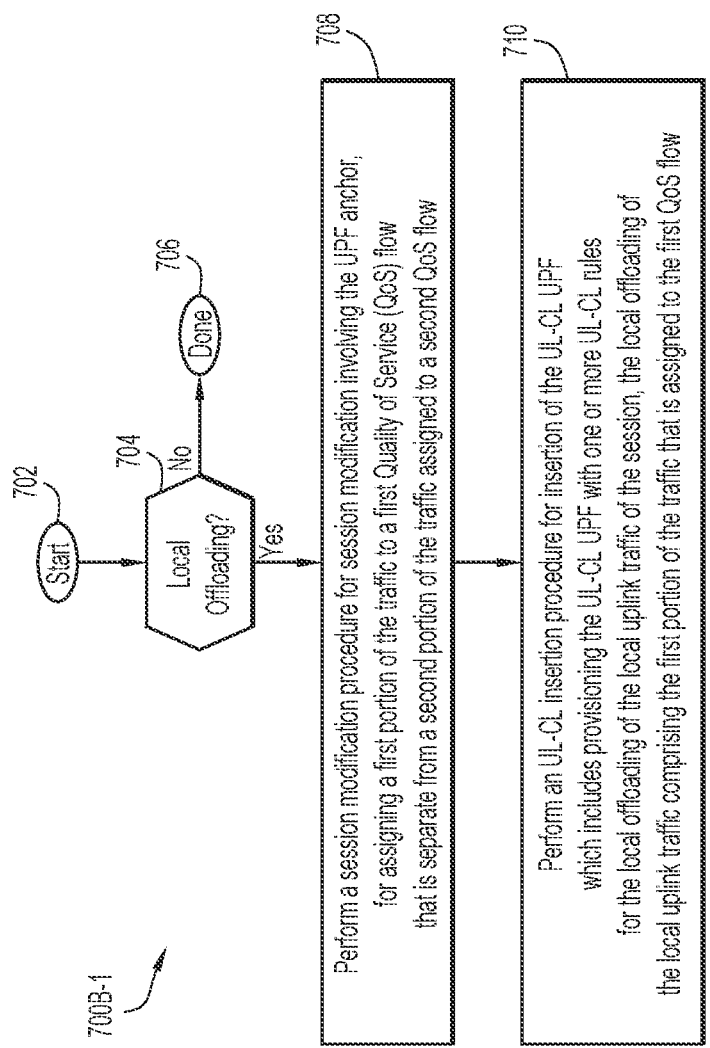
Figures 2, 7B:
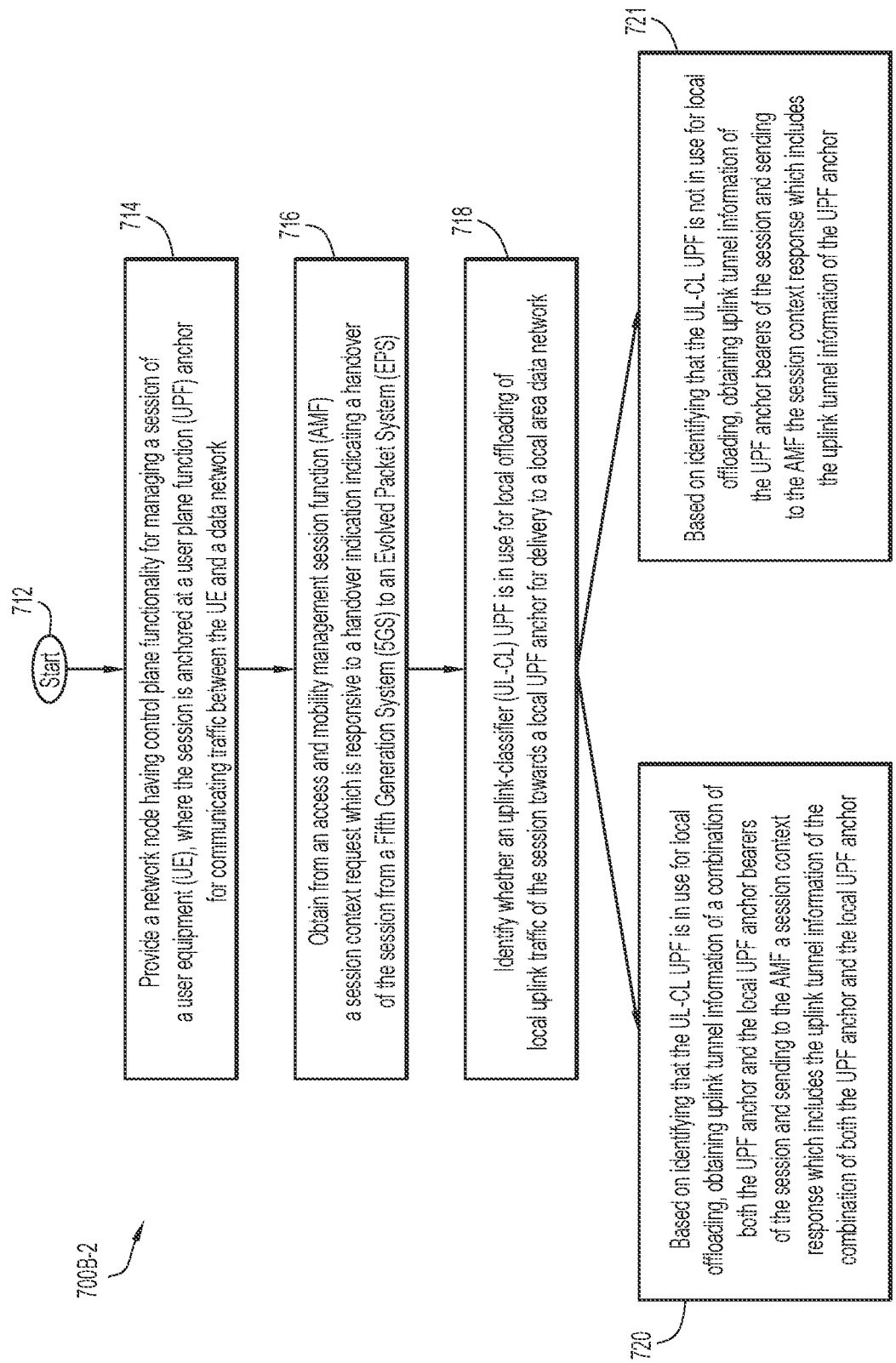
Figures 3, 7B:
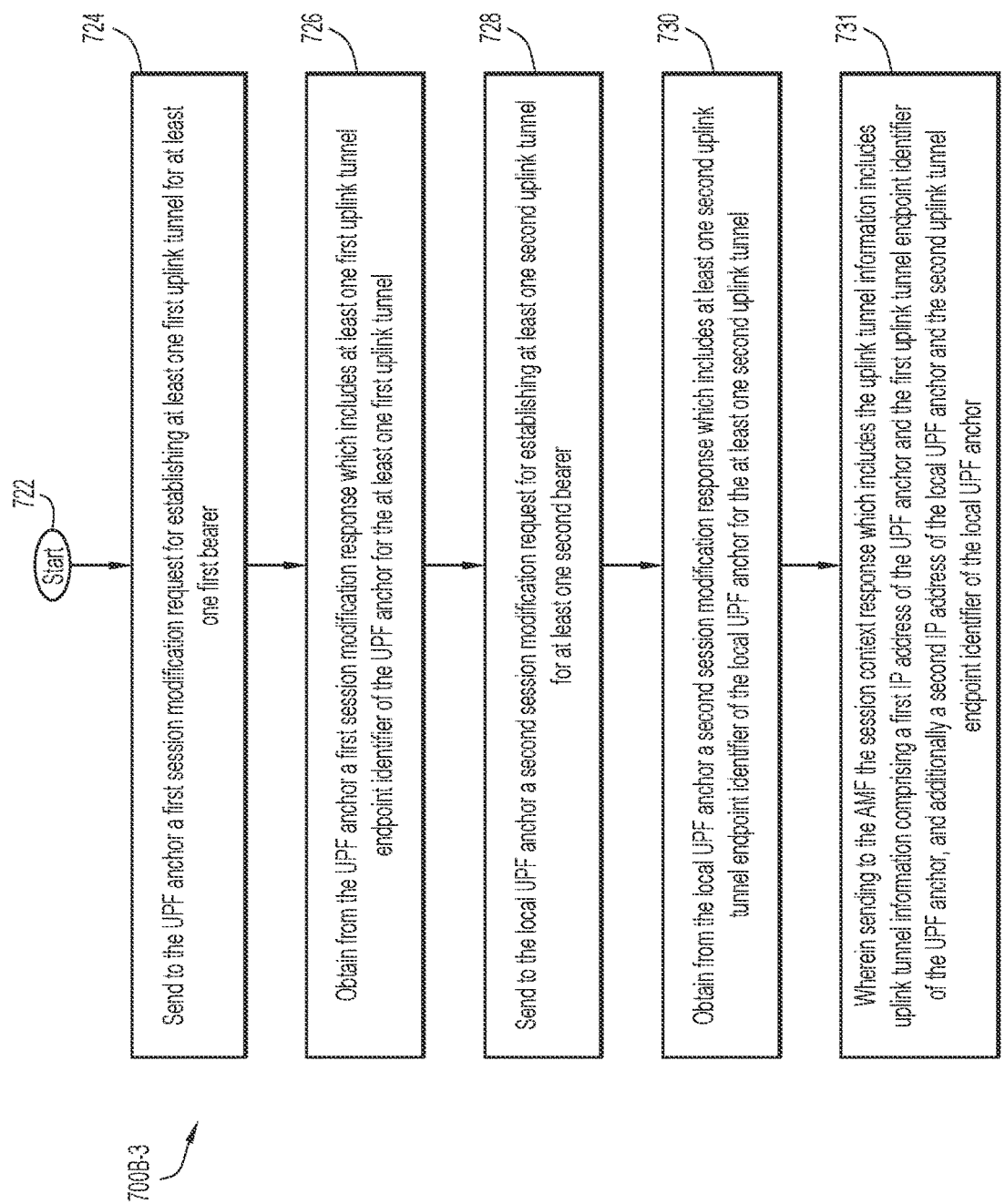
Figures 4, 7B:
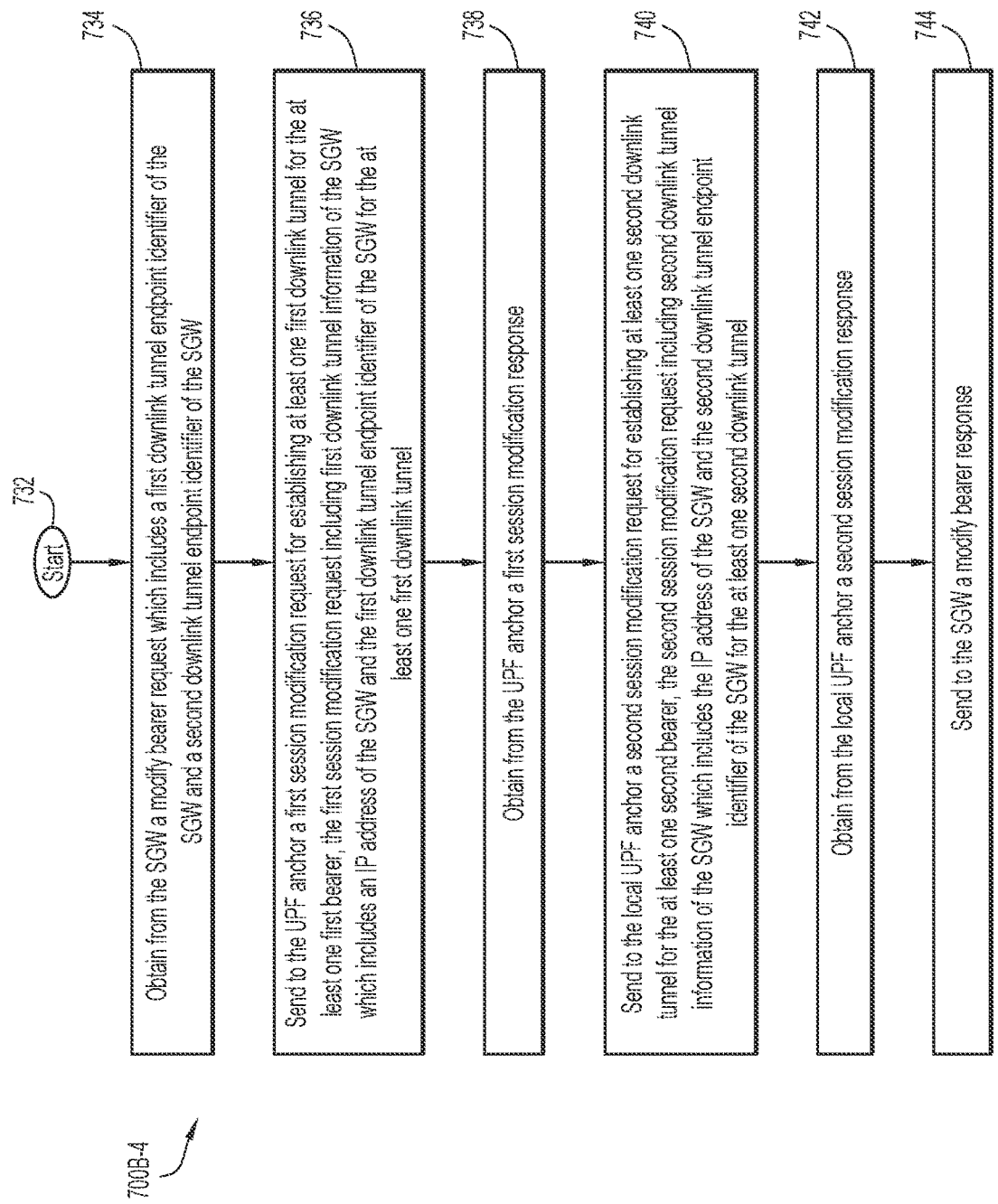

FIG. 7B-1 is a flowchart 700B-1 for describing a method for use in managing a session of a UE for handover from a 5GS to an EPS according to some implementations of the present disclosure. The method may be performed by a network node having control plane functionality for managing the session of the UE. In some implementations, the network node having the control plane functionality may be a network node having an SMF+PGW-C for use in interworking between the 5GS and the EPS. The method may be embodied in a computer program product which includes a non-transitory computer readable medium and instructions stored in the non-transitory computer readable medium, where the instructions are executable by one or more processors of the network node. In the method of FIG. 7B-1, when an UL-CL UPF is in use for the local offloading, the network node operates to interact with and use tunnel information of a combination of both the UPF anchor and the local UPF anchor for establishing bearers with the SGW (or more specifically, the SGW-U in the CUPS architecture) for the handover from the 5GS to the EPS, thereby maintaining the local offloading toward the local UPF anchor.

In the method of FIG. 7B-1, a network node having control plane functionality for managing a session of a UE is provided. The network node may manage a session of a UE which is anchored at a UPF anchor for communicating traffic between the UE and a data network. Beginning at a start block 702 of FIG. 7B-1, the network node may identify whether a local offloading of local uplink traffic for the session is requested or otherwise indicated, for 5GS to EPS handover (step 704 of FIG. 7B-1). If not, the session is not modified and the flowchart ends at a done block 706. Based on identifying that that the local offloading of local uplink traffic of the session is requested or otherwise indicated at step 704, traffic of the session for the local offloading is assigned to a new QoS flow. Here, the network node may perform a session modification procedure for session modification involving the UPF anchor, for assigning a first portion of traffic to a first QoS flow (e.g. for the local offloading) that is separate from a second portion of traffic assigned to a second QoS flow (step 708 of FIG. 7B-1). Then, the network node may perform an UL-CL insertion procedure for insertion of the UL-CL UPF, which includes provisioning the UL-CL UPF with one or more UL-CL rules for the local offloading of the local uplink traffic corresponding to the first portion of traffic that is assigned to the first QoS flow (step 710 of FIG. 7B-1).

Processing in relation to the flowcharts of FIGS. 7B-2, 7B-3, and 7B-4 may now be performed, now that the traffic of the session for the local offloading is assigned to a new QoS flow (e.g. the first QoS flow). Beginning at a start block 712 of FIG. 7B-2, a network node having control plane functionality for managing a session of a UE is provided (step 714 of FIG. 7B-2). The network node may manage a session of a UE which is anchored at a UPF anchor for communicating traffic between the UE and a data network. During operation, the network node may obtain from an AMF a session context request for requesting a session context of the session of the UE (step 716 of FIG. 7B-2). The session context request may be communicated in response to a handover indication (e.g. received or obtained at the AMF) indicating a handover of the session of the UE from the 5GS to the EPS. In response to obtaining the session context request, the network node may identify whether a UL-CL UPF is in use for a local offloading of local uplink traffic of the session, for example, towards a local UPF anchor for delivery to a local area data network (step 718 of FIG. 7B-2).

Based on identifying that the UL-CL UPF is in use for the local offloading, the network node may obtain uplink tunnel information of a combination of both the UPF anchor and the local UPF anchor and send to the AMF a session context response which includes the uplink tunnel information of both the UPF anchor and the local UPF anchor (step 720 of FIG. 7B-2). For the handover of the session from the 5GS to the EPS, at least a first bearer of the session may be established between the SGW and the UPF anchor and at least a second bearer of the session may be established between the SGW and the local UPF anchor, which is for the local offloading of the local uplink traffic which corresponds to the first portion of traffic that is assigned to the first QoS flow. In particular, the sending of the session context response which includes the uplink tunnel information in step 720 of FIG. 7B-2 may cause the at least first bearer to be established between the SGW and the UPF anchor and the at least the second bearer to be established between the SGW and the local UPF anchor, which is for the local offloading of the local uplink traffic which includes the first portion of traffic that is assigned to the first QoS flow.

On the other hand, based on identifying that the UL-CL UPF is not in use for the local offloading, the network node may obtain uplink tunnel information of the UPF anchor for the bearers of the session and send to the AMF the session context response which includes the uplink tunnel information of the UPF anchor for the bearers of the session (step 721 of FIG. 7B-2). The sending of the session context response in step 721 of FIG. 7B-2 which includes the uplink tunnel information of the UPF anchor may cause the at least one bearer to be established between the SGW and the UPF anchor for the handover of the session from the 5GS to the EPS.

In step 720 of FIG. 7B-2, the network node interacts with and uses tunnel information of a combination of both the UPF anchor and the local UPF anchor (e.g. instead of just the UPF anchor) for establishing the bearers with the SGW (or more specifically, the SGW-U in the CUPS architecture). The method of FIG. 7B-2 may be continued in relation to FIGS. 7B-3 and 7B-4, which describe step 720 of FIG. 7B-2 in more detail.

Continuing the method with reference now to a flowchart 700B-3 of FIG. 7B-3, and beginning at a start block 722 of FIG. 7B-3, the network node may send to the UPF anchor a first session modification request for establishing at least one first uplink tunnel for at least one first bearer (step 724 of FIG. 7B-3). The network node may then obtain from the UPF anchor a first session modification response which includes at least one first uplink tunnel endpoint identifier of the UPF anchor for the at least one first uplink tunnel (step 726 of FIG. 7B-3). In addition, the network node may send to the local UPF anchor a second session modification request for establishing at least one second uplink tunnel for at least one second bearer (step 728 of FIG. 7B-3). The network node may then obtain from the local UPF anchor a second session modification response which includes at least one second uplink tunnel endpoint identifier of the local UPF anchor for the at least one second uplink tunnel (step 730 of FIG. 7B-3). The session context response which includes the uplink tunnel information may include uplink tunnel information comprising a first IP address of the UPF anchor and the first uplink tunnel endpoint identifier of the UPF anchor, as well as a second IP address of the local UPF anchor and the second uplink tunnel endpoint identifier of the local UPF anchor (step 731 of FIG. 7B-3). The sending of the session context response in 720 of FIG. 7B-2 which includes the uplink tunnel information may cause the at least the first bearer to be established between a SGW and the UPF anchor for communicating the second portion of traffic that is assigned to the second QoS flow, and may cause the at least the second bearer to be established between the SGW and the local UPF anchor for the local offloading of the local uplink traffic corresponding to the first portion of traffic that is assigned to the first QoS flow.

With reference now to a flowchart 700B-4 of FIG. 7B-4, and beginning at a start block 732 of FIG. 7B-4, the network node may obtain from the SGW a modify bearer request which includes a first downlink tunnel endpoint identifier of the SGW and a second downlink tunnel endpoint identifier of the SGW (step 734 of FIG. 7B-4). The network node may then send to the UPF anchor a first session modification request for establishing at least one first downlink tunnel for the at least one first bearer, where the first session modification request includes first downlink tunnel information of the SGW which includes an IP address of the SGW and the first downlink tunnel endpoint identifier of the SGW for the at least one first downlink tunnel (step 736 of FIG. 7B-4). The network node may obtain from the UPF anchor a first session modification response (step 738 of FIG. 7B-4). The network node may then send to the local UPF anchor a second session modification request for establishing at least one second downlink tunnel for the at least one second bearer and obtain from the local UPF anchor a second session modification response, where second session modification request includes second downlink tunnel information of the SGW which includes the IP address of the SGW and the second downlink tunnel endpoint identifier of the SGW for the at least one second downlink tunnel (step 740 of FIG. 7B-4). The network node may then obtain from local UPF 162 a message indicating a second session modification response (step 742 of FIG. 7B-4). The network node may send to the SGW a modify bearer response (step 744 of FIG. 7B-4).

FIGS. 7C-1, 7C-2, and 7C-3 are diagrams 700C-1, 700C-2, and 700C-3 which form a call flow diagram for describing a call flow for managing a session of a UE for handover from the 5GS to the EPS according to some implementations of the present disclosure. The call flow diagram of 7C-1, 7C-2, and 7C-3 corresponds to the method(s) of FIGS. 7B-1, 7B-2, 7B-3, and 7B-4, where the network node having the control plane functionality for session management operates to, for the handover of the session from the 5GS to the EPS, interact with and use tunnel information of a combination of both the UPF anchor and the local UPF anchor for establishing bearers with the SGW (or more specifically, the SGW-U in the CUPS architecture), maintaining a local offloading of local uplink traffic that is assigned to a new, separate QoS flow.

Figures 1, 7C:
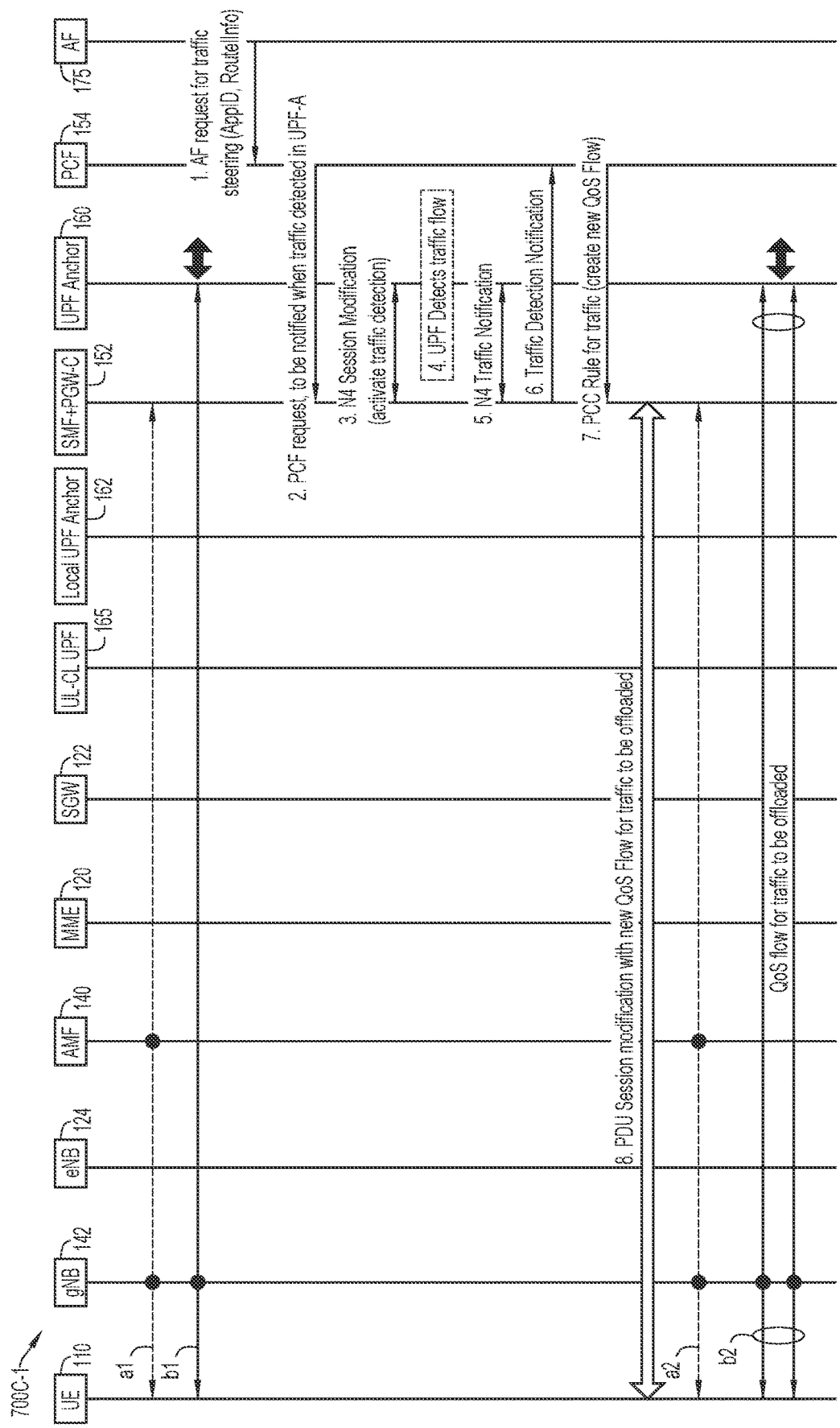
Figures 2, 7C:
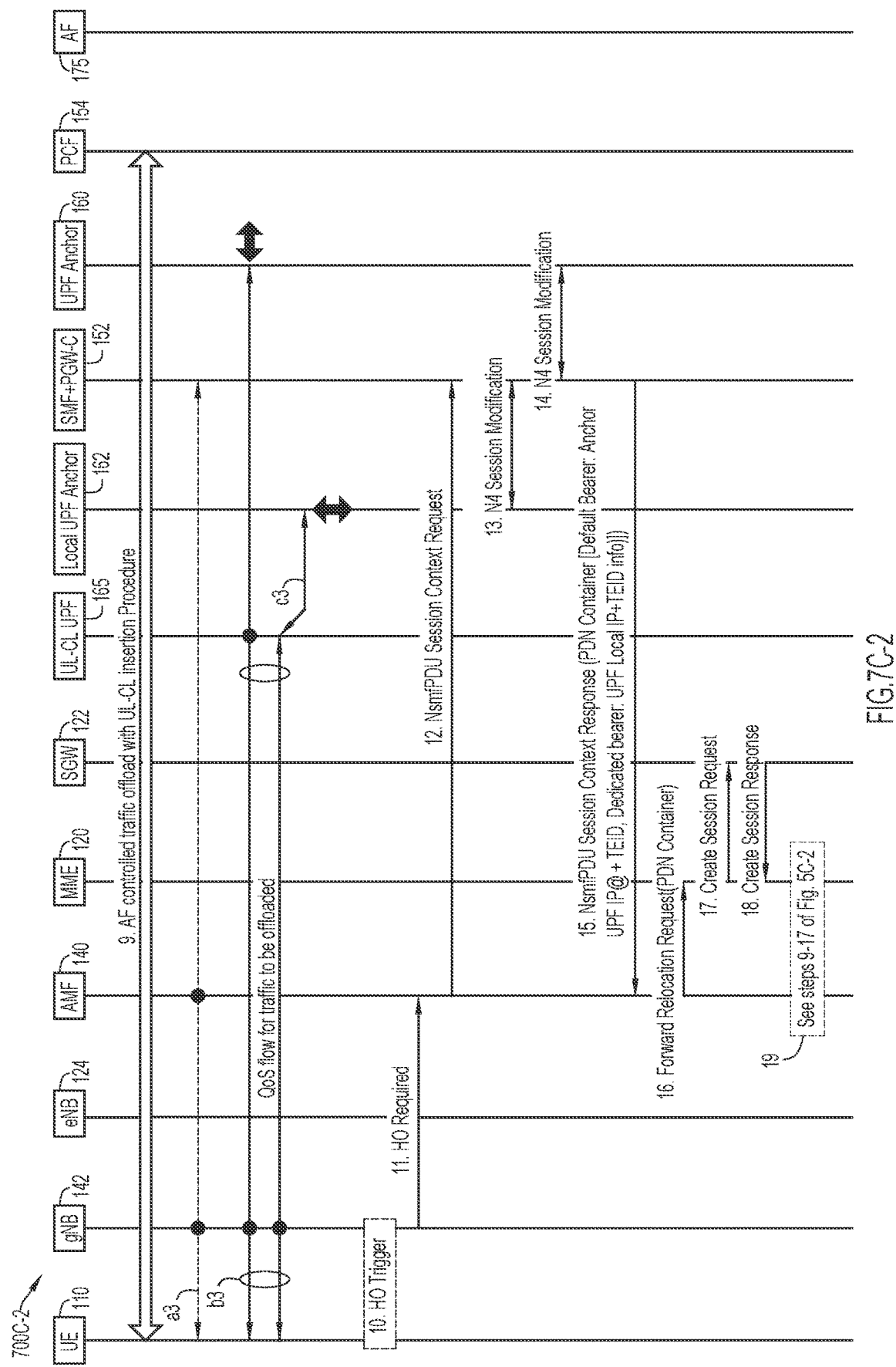
Figures 3, 7C:
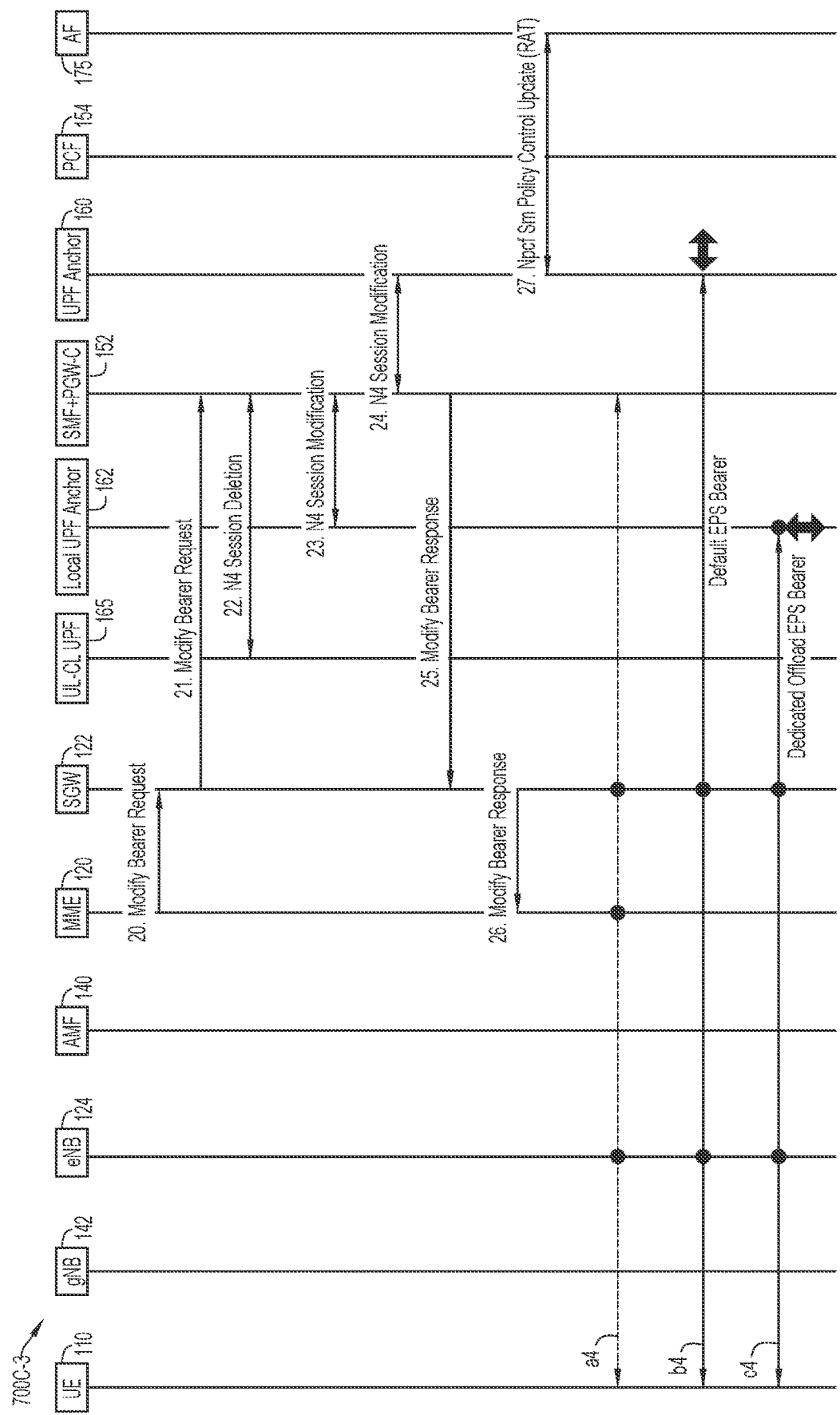

With reference to diagram 700C-1 of FIG. 7C-1, UE 110 is registered in the 5GS via gNB 142 with a session of UE 110 established for the communication of traffic. The session may be a PDU session. For control plane signaling, AMF 140 operates for mobility management and SMF+PGW-C 152 operates for session management (see an indicator a1 of FIG. 7C-1). For the user plane, the session of UE 110 may be anchored at UPF anchor 160 for communicating traffic between UE 110 and a data network (see an indicator b1 of FIG. 7C-1).

In some implementations, an application function (AF) controlled traffic offload with an UL-CL insertion procedure is utilized in the call flow. In FIG. 700C-1, steps 1 through 8 may be performed for assigning a first portion of traffic of the session to a first QoS flow (e.g. for subsequent local offloading) that is separate from a second portion of traffic assigned to a second QoS flow. To begin, an AF 175 may send to PCF 154 a request for traffic steering, where the request may indicate the offload traffic to be detected (e.g. detect traffic associated with www.website.com) (step 1 of FIG. 7C-1). Here, AF 175 may utilize an Npcf Policy Authorization Service of PCF 154 provided via an Application Programming Interface (API). In response to the request, PCF 154 identifies (e.g. an indication indicating) whether 5GS to EPS handover is supported. Based on identifying (e.g. the indication indicating) that 5GS to EPS handover is supported, PCF 154 operates to separate the traffic into separate QoS flows (e.g. create the new, separate QoS flow). To that end, PCF 154 may request SMF+PGW-C 152 to notify PCF 154 when traffic of the session matches the offload traffic to be detected (e.g. using one or more rules or pre-configured rules) (step 2 of FIG. 7C-1). In response, SMF+PGW-C 152 may perform a session modification procedure for session modification involving UPF anchor 160, for provisioning UPF anchor 160 to detect the offload traffic using the one or more rules (e.g. detect traffic associated with www.website.com) (step 3 of FIG. 7C-1).

Subsequently, UPF anchor 160 may detect the offload traffic using the one or more rules (step 4 of FIG. 7C-1). In response, UPF anchor 160 may perform a traffic notification procedure with SMF+PGW-C 152, sending to SMF+PGW-C 152 a message indicating a notification of the detection of the traffic to be offloaded (step 5 of FIG. 7C-1). In response, SMF+PGW-C 152 may send to PCF 154 a message indicating a notification of detection of the traffic to be offloaded (step 6 of FIG. 7C-1). In response, PCF 154 may send to SMF+PGW-C 152 a message for creating a new, separate QoS flow for the detected traffic, using one or more rules (e.g. policy and charging control or "PCC" rules) (step 7 of FIG. 7C-1). SMF+PGW-C 152 may perform a session modification procedure for session modification involving UPF anchor 160, using the one or more rules, for assigning a first portion of traffic to a first QoS flow (e.g. for subsequent local offloading) that is separate from a second portion of traffic assigned to a second QoS flow (step 8 of FIG. 7C-1). See e.g. 3GPP specification, TS 23.502, clause 4.3.3, "PDU Session Modification."

Now, for control plane signaling, AMF 140 still operates for mobility management and SMF+PGW-C 152 still operates for session management (see an indicator a2 of FIG. 7C-1). For the user plane, the session of UE 110 may be anchored at UPF anchor 160 for communicating traffic between UE 110 and the data network, where the first portion of traffic is assigned to the first QoS flow (e.g. for the subsequent local offloading) and the second portion of traffic is assigned to the second QoS flow (see an indicator b2 of FIG. 7C-1).

With reference now to diagram 700C-2 of FIG. 7C-2, an UL-CL insertion procedure for insertion of UL-CL UPF 165 may be performed (step 9 of FIG. 7C-2). The UL-CL insertion procedure may be initiated by PCF 154 which may instruct SMF+PGW-C 152 to provision a UPF (UL-CL UPF 165) with one or more UL-CL rules. The one or more UL-CL rules may be for the local offloading of the local uplink traffic which corresponds to the first portion of traffic that is assigned to the first QoS flow. The local offloading of the local uplink traffic may be may be an AF-controlled traffic offloading with AF 175. See e.g. 3GPP specification, TS 23.502, clause 4.3.6, "Application Function influence on traffic routing," steps 6 through 13.

Now, for control plane signaling, AMF 140 still operates for mobility management and SMF+PGW-C 152 still operates for session management (see an indicator a3 of FIG. 7C-2). For the user plane, the session of UE 110 may be anchored at UPF anchor 160 for communicating traffic between UE 110 and the data network (see an indicator b3 of FIG. 7C-2), where the first portion of traffic assigned to the first QoS flow corresponds to the local uplink traffic for the local offloading towards local UPF anchor 162 for delivery to the local area data network (see an indicator c3 of FIG. 7C-2).

Processing in relation to steps 10 through 19 of FIG. 7C-2 and steps 20 through 27 of FIG. 7C-3 may now be performed, now that the traffic of the session for the local offloading is assigned to the new, separate QoS flow (e.g. the first QoS flow). Sometime during operation of UE 110, a HO of the session from the 5GS to the EPS may be initiated or triggered (e.g. based on an indication of 5G coverage loss, or an indication of EPS fallback due to voice call, etc.) (step 10 of FIG. 7C-2). The gNB 142 may communicate to AMF 140 a message indicating HO required (step 11 of FIG. 7C-2). In response, AMF 140 may send to SMF+PGW-C 152 a message indicating a session context request for requesting a session context of the session of UE 110 (step 12 of FIG. 7C-2). More specifically, the session context request may be an Nsmf PDU Session Context Request. The session context request may be communicated in response to a handover indication (e.g. received or obtained at the AMF) indicating a handover of the session of the UE from the 5GS to the EPS. SMF+PGW-C 152 may receive the message and thereby obtain the session context request.

In response, SMF+PGW-C 152 may identify whether any UL-CL UPF is in use for a local offloading of local uplink traffic of the session. In the present scenario, SMF+PGW-C 152 identifies that UL-CL UPF 165 is in use for the local offloading of local uplink traffic towards local UPF anchor 162 for delivery to the local area data network. Based on identifying that UL-CL UPF 165 is in use for the local offloading, SMF+PGW-C 152 may interact with and use tunnel information of both UPF anchor 160 and local UPF anchor 162 (e.g. instead of just UPF anchor 160) for the handover from the 5GS to the EPS, for establishing bearers with SGW 122 and maintaining the local offloading of local uplink traffic that is assigned to the new, separate QoS flow.

Here, SMF+PGW-C 152 may perform a first session modification procedure with local UPF anchor 162 (step 13 of FIG. 7C-2). In step 13, SMF+PGW-C 152 may perform the first session modification procedure with local UPF anchor 162 for establishing a CN tunnel QoS flow to be offloaded as an EPS bearer and provide EPS bearer contexts to AMF 140. See e.g. 3GPP specification, TS 23.502, clause 4.11.1.4.1, "EPS bearer ID allocation," step 8 in the description of the figure. Here, SMF+PGW-C 152 may send to local UPF anchor 162 a first session modification request for establishing at least one first uplink tunnel for at least one first bearer (e.g. dedicated bearer). SMF+PGW-C 152 may then obtain from local UPF anchor 162 a first session modification response which includes at least one first uplink tunnel endpoint identifier (e.g. first UL TEID) of local UPF anchor 162 for the at least one first uplink tunnel.

SMF+PGW-C 152 may perform a second session modification procedure with UPF anchor 160 (step 14 of FIG. 7C-2). In the second session modification procedure with UPF anchor 160 in step 14, SMF+PGW-C 152 may send to UPF anchor 160 a second session modification request for establishing at least one second uplink tunnel for at least one second bearer (e.g. default bearer). SMF+PGW-C 152 may then obtain from the UPF anchor a second session modification response which includes at least one second uplink tunnel endpoint identifier (e.g. second UL TEID) of UPF anchor 160 for the at least one second uplink tunnel.

SMF+PGW-C 152 may obtain the uplink tunnel information and send to AMF 140 a message indicating a session context response which includes the uplink tunnel information (step 15 of FIG. 7C-2). The uplink tunnel information may include a first IP address of local UPF anchor 162 and the first uplink tunnel endpoint identifier of local UPF anchor 162, as well as a second IP address of UPF anchor 160 and the second uplink tunnel endpoint identifier of UPF anchor 160. The session context response may be an Nsmf PDU Session Context Response having a PDN Container including the first IP address and the first UL TED of local UPF anchor 162, and the second IP address and the second UL TED of UPF anchor 160. The sending of the session context response in step 15 of FIG. 7C-2 which includes the uplink tunnel information may cause bearers to be established with SGW 122 for the handover from the 5GS to the EPS, including at least a first bearer to be established between SGW 122 and UPF anchor 160 and at least a second bearer to be established between SGW 122 and local UPF anchor 162 for the local offloading of the local uplink traffic corresponding to the first portion of traffic that is assigned to the first QoS flow.

AMF 140 may receive the message in step 15 and thereby obtain the session context response which includes the uplink tunnel information. AMF 140 may send to MME 120 a message indicating a forward relocation request (step 16 of FIG. 7C-2). The forward relocation request may include the PDN Container. In response, MME 120 may send to SGW 122 a message indicating a create session request (step 17 of FIG. 7C-2). The create session request may include the uplink tunnel information, and be for establishing the tunnels for the bearers with SGW 122. SGW 122 may send to MME 120 a message indicating a create session response (step 18 of FIG. 7C-2). Next, in step 19 of FIG. 7C-2, steps 9 through 17 of FIG. 5C-2 or FIG. 6C-2 may be performed, for following conventional message processing for 5GS to EPS handover, as described in the 3GPP specifications.

With reference now to diagram 700C-3 of FIG. 7C-3, MME 120 may send to SGW 122 a message indicating a modify bearer request (step 20 of FIG. 7C-3), which triggers SGW 122 to send to SMF+PGW-C 152 a message indicating a modify bearer request (step 21 of FIG. 7C-3). The modify bearer request may include a first downlink tunnel endpoint identifier and a second downlink tunnel endpoint identifier (e.g. a first DL TEID and a second DL TEID) of SGW 122.

SMF+PGW-C 152 may receive the message and thereby obtain the modify bearer request. In response, SMF+PGW-C 152 may perform a session deletion procedure with UL-CL UPF 165 for deleting the association with UL-CL UPF 165, as it is no longer needed (step 22 of FIG. 7C-3).

SMF+PGW-C 152 may then perform a first session modification procedure with local UPF anchor 162 (step 23 of FIG. 7C-3). In the first session modification procedure of step 19, SMF+PGW-C 152 may send to local UPF anchor 162 a first session modification request for establishing at least one first downlink tunnel for the at least one first bearer. The first session modification request may include first downlink tunnel information of SGW 122 which includes an IP address of SGW 122 and the first downlink tunnel endpoint identifier (e.g. the first TED) of SGW 122 for the at least one first downlink tunnel. Local UPF anchor 162 may send to SMF+PGW-C 152 a message indicating a first session modification response. SMF+PGW-C 152 may receive this message and thereby obtain the first session modification response.

SMF+PGW-C 152 may then perform a second session modification procedure with UPF anchor 160 (step 24 of FIG. 7C-3). In the second session modification procedure of step 20, SMF+PGW-C 152 may then send to UPF anchor 160 a second session modification request for establishing at least one second downlink tunnel for the at least one second bearer. The second session modification request may include second downlink tunnel information of SGW 122 which includes the IP address of SGW 122 and the second downlink tunnel endpoint identifier (e.g. the second TEID) of SGW 122 for the at least one second downlink tunnel. UPF anchor 160 may send to SMF+PGW-C 152 a message indicating a second session modification response. SMF+PGW-C 152 may receive this message and thereby obtain the second session modification response.

In response, SMF+PGW-C 152 may send to SGW 122 a message indicating a modify bearer response (step 25 of FIG. 7C-3) which is responsive to the modify bearer request of step 21. SGW 122 may receive and process the message, and in response, send to MME 120 a message indicating a modify bearer response (step 26 of FIG. 7C-3) which is responsive to the modify bearer request of step 20. SMF+PGW-C 152 may perform a policy control update with PCF 154 to inform PCF 154 of a change in RAT type due to the handover (step 27 of FIG. 7C-3). More specifically, the policy control update may be an Npcf Sm Policy Control Update.

The handover of the session of UE 110 from the 5GS to the EPS is now complete. UE 110 communicates in the session for the communication of traffic via eNB 124 of the EPS. Now, for control plane signaling, UE 110 has a NAS connection with MME 120, where MME 120 operates for mobility management and SGW 122 (e.g. the SGW-C) operates for session management (see an indicator a4 of FIG. 7C-3). For the user plane, a default bearer of the session may be anchored at UPF anchor 160 for communicating traffic between UE 110 and the data network (see an indicator b4 of FIG. 7C-3), and a dedicated bearer of the session may be anchored at local UPF anchor 162 for the local offloading of local uplink traffic to the local area data network (see an indicator c4 of FIG. 7C-3).

The above examples have been described for handovers of sessions from the 5GS to the EPS using the N26 interface; however, the techniques and mechanisms may be applied to handovers of sessions from the 5GS to the EPS using a non-N26 interface. Here, control plane addresses (not the user plane addresses) of the SMF+PGW-C are registered in the UDM+HSS. Also note that, in the above examples, a UPF or UPF anchor may be or include a UPF+PGW-U, and/or a PGW may be or include a UPF+PGW-U.

Figure 8:
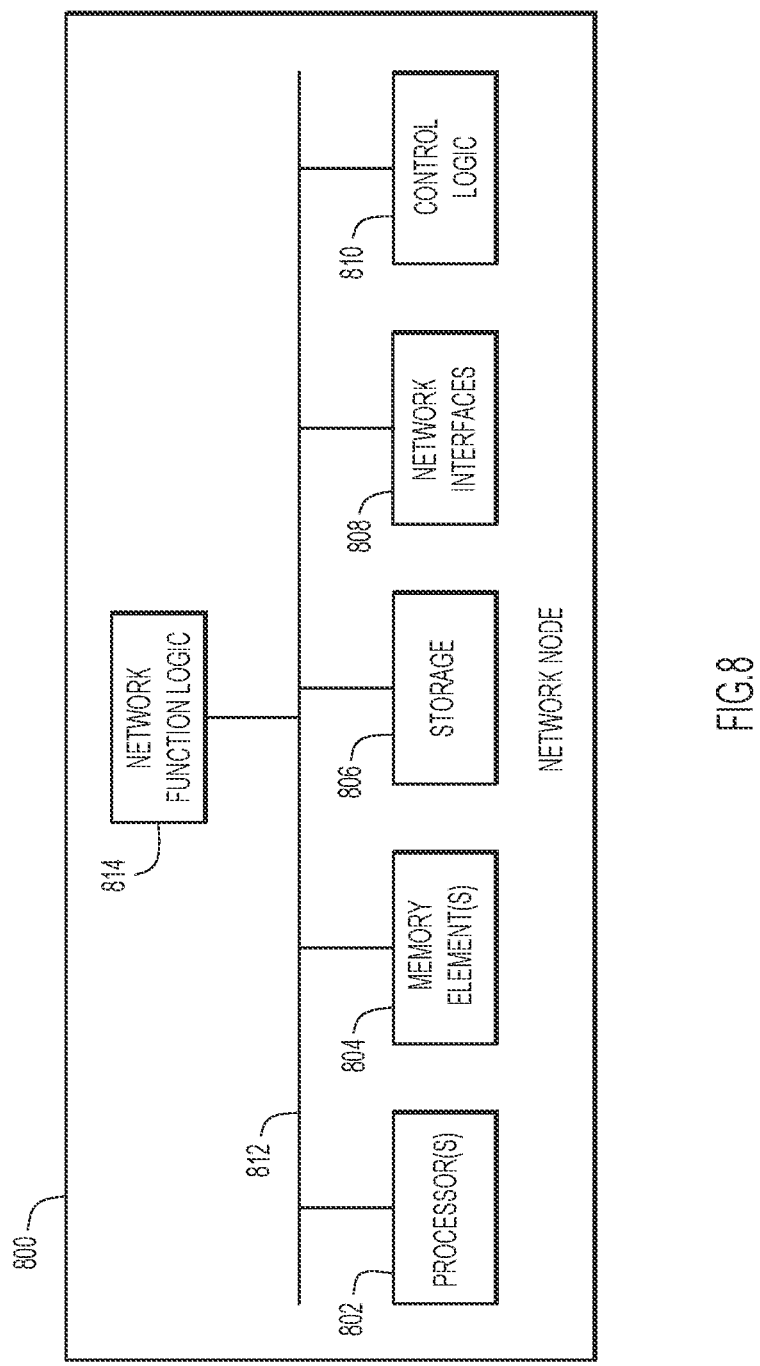
FIG. 8 is a schematic block diagram of a network node having control plane functionality for session management for interworking between the 5GS and the EPS, such as a Session Management Function (SMF) plus a Packet Data Network Gateway Control Plane Function (PGW-C) (SMF+PGW-C), according to some implementations of the present disclosure.

FIG. 8 is a schematic block diagram of a network node 800 (e.g. a compute or computing node or network equipment) having control plane functionality for managing a session of a UE (e.g. one or more control plane function(s) for session management), such as an SMF+PGW-C, according to some implementations of the present disclosure.

In various embodiments, network element functionality may be performed using any combination of network nodes. In various embodiments, network node 800 can be implemented as, for example, a data center network node such as a server, rack of servers, multiple racks of servers, etc., for a data center; or a cloud network node, which may be distributed across one or more data centers.

In some implementations, network node 800 may include one or more processors 802, one or more memory elements 804, storage 806, network interfaces 808, control logic 810 and network function logic 814. In some implementations, processors 802 are at least one hardware processor configured to execute various tasks, operations and/or functions for network node 800 as described herein according to software and/or instructions configured for network node 800. In some implementations, memory elements 804 and/or storage 806 are configured to store data, information, software, instructions, logic (e.g. any logic 810 and/or 814), data structures, combinations thereof, or the like for various embodiments described herein. Note that in some implementations, storage may be consolidated with memory elements (or vice versa), or may overlap/exist in any other suitable manner.

In some implementations, network interfaces 808 enable communication between for network node 800 and other network elements, systems, slices, etc. that may be present in the system to facilitate operations as discussed for various embodiments described herein. In some implementations, network interfaces 808 may include one or more Ethernet drivers and/or controllers, Fiber Channel drivers, and/or controllers, or other similar network interface drivers and/or controllers to enable communications for network node 800 within the system.

In some implementations, control logic 810 may include instructions that, when executed (e.g. via processors 802), cause for network node 800 to perform operations, which may include, but not be limited to, providing overall control operations of network node 800; cooperating with other logic, data structures, etc. provisioned for and/or maintained by network node 800; combinations thereof; or the like to facilitate various operations as discussed for various embodiments described herein.

In some implementations, bus 812 may be configured as an interface that enables one or more elements of network node 800 (e.g. processors 802, memory elements 804, logic, etc.) to communicate in order to exchange information and/or data. In at least one embodiment, bus 812 may be implemented as a fast kernel-hosted interconnect, potentially using shared memory between processes (e.g. logic, etc.), which may enable efficient communication paths between the processes. In some implementations, network function logic 814 may include instructions that, when executed (e.g. via one or more processors 802) cause network node 800 to perform one or more operations for one or more network elements as discussed for various implementations described herein.

In some implementations, each of the elements of the system may couple to one another through simple interfaces or through any other suitable connection (wired or wireless), which provides a viable pathway for network communications. As referred to herein, a physical (wired or wireless) interconnection or interface may refer to an interconnection of one element or node with one or more other element(s), while a logical interconnection or interface may refer to communications, interactions and/or operations of elements with each other, which may be directly or indirectly interconnected, in a network environment.

The terms 'data', 'information', 'parameters' and variations thereof as used herein may refer to any type of binary, numeric, voice, video, textual or script data or information or any type of source or object code, or any other suitable data or information in any appropriate format that may be communicated from one point to another in electronic devices and/or networks. Additionally, messages, requests, responses, replies, queries, etc. are forms of network traffic and, therefore, may comprise one or more packets.

In some implementations, a network may be associated with and/or provided by a single network operator or service provider and/or multiple network operators or service providers. In various embodiments, the network node may include and/or overlap with, in whole or in part, one or more packet data network(s) (e.g. one or more packet data networks). A network may offer communicative interfaces between various elements and may be further associated with any LAN, wireless local area network (WLAN), metropolitan area network (MAN), wide area network (WAN), virtual private network (VPN), RAN, virtual local area network (VLAN), enterprise network, Intranet, extranet, Low Power Wide Area Network (LPWAN), Low Power Network (LPN), M2M network, IoT Network, or any other appropriate architecture or system that facilitates communications in a network environment.

The terms 'UE', 'mobile device,' 'mobile radio device,' 'end device', 'user', 'subscriber' or variations thereof can be used herein interchangeably and are inclusive of devices used to initiate a communication, such as a computer, an electronic device such as an IoT device (e.g. an appliance, a thermostat, a sensor, a parking meter, etc.), a personal digital assistant (PDA), a laptop or electronic notebook, a cellular telephone, an IP phone, an electronic device having cellular and/or Wi-Fi connection capabilities, a wearable electronic device, or any other device, component, element, or object capable of initiating voice, audio, video, media, or data exchanges within the system. A UE may also be inclusive of a suitable interface to a human user such as a microphone, a display, a keyboard, or other terminal equipment.

Note that in some implementations, operations as outlined herein to facilitate techniques of the present disclosure may be implemented by logic encoded in one or more tangible media, which may be inclusive of non-transitory tangible media and/or non-transitory computer readable storage media (e.g. embedded logic provided in an ASIC, in digital signal processing (DSP) instructions, software—potentially inclusive of object code and source code—to be executed by a processor, or other similar machine, etc.). In some of these instances, a memory element and/or storage may store data, software, code, instructions (e.g. processor instructions), logic, parameters, combinations thereof or the like used for operations described herein. This includes memory elements and/or storage being able to store data, software, code, instructions (e.g. processor instructions), logic, parameters, combinations thereof, or the like that are executed to carry out operations described herein.

A processor (e.g. a hardware processor) may execute any type of instructions associated with data to achieve the operations detailed herein. In one example, a processor may transform an element or an article (e.g. data, information) from one state or thing to another state or thing. In another example, operations outlined herein may be implemented with logic, which may include fixed logic, hardware logic, programmable logic, digital logic, etc. (e.g. software/computer instructions executed by a processor), and/or one or more the elements identified herein could be some type of a programmable processor, programmable digital logic (e.g. a field programmable gate array (FPGA), a DSP processor, an EPROM, a controller, an electrically erasable PROM (EEPROM), or an ASIC) that includes digital logic, software, code, electronic instructions, or any suitable combination thereof.

It is also noted that the operations and steps described with reference to the preceding figures illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that the system (and its teachings) are readily scalable and can accommodate a large number of components, as well as more complicated/sophisticated arrangements and configurations. Accordingly, the examples provided should not limit the scope or inhibit the broad teachings of the system as potentially applied to a myriad of other architectures.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, the system may be applicable to other exchanges or routing protocols, interfaces, and/or communications standards, proprietary, and/or non-proprietary. Moreover, although the system has been illustrated with reference to particular elements and operations that facilitate the communication process, these elements, and operations may be replaced by any suitable architecture or process that achieves the intended functionality of the system.

Although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

It will also be understood that, although the terms "first," "second," etc. may be used herein to describe various elements, these elements should not be limited by these terms. These terms are used to distinguish one element from another. For example, a first user plane anchor could be termed a second user plane anchor, and similarly, a second user plane anchor could be termed a first user plane anchor, without changing the meaning of the description, so long as all occurrences of the "first user plane anchor" are renamed consistently and all occurrences of the "second user plane anchor" are renamed consistently. The first user plane anchor and the second user plane anchor are both user plane anchors, but they are not the same user plane anchor.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
    at a network node having control plane functionality for managing a session of a user equipment (UE), wherein the session is anchored at a User Plane Function (UPF) anchor for communicating traffic between the UE and a data network,
        obtaining from an Access and Mobility Management Function (AMF) a session context request responsive to a handover indication indicating a handover of the session from a Fifth Generation System (5GS) to an Evolved Packet System (EPS);
        identifying whether an uplink classifier (UL-CL) UPF is in use for a local offloading of local uplink traffic of the session towards a local UPF anchor for delivery to a local area data network;
based on identifying that the UL-CL UPF is not in use for the local offloading, obtaining uplink tunnel information of the UPF anchor for at least one bearer of the session and sending to the AMF a session context response which includes the uplink tunnel information of the UPF anchor, to cause the at least one bearer to be established between a Serving Gateway (SGW) and the UPF anchor for the handover of the session from the 5GS to the EPS; and
based on identifying that the UL-CL UPF is in use for the local offloading, obtaining uplink tunnel information of the UL-CL UPF for the at least one bearer of the session and sending to the AMF the session context response which includes the uplink tunnel information of the UL-CL UPF, to cause the at least one bearer to be established between the SGW and the UL-CL UPF for the handover of the session from the 5GS to the EPS for maintaining the local offloading of the local uplink traffic.

2. The method of claim 1,
wherein the handover is triggered in response to an EPS fallback for the UE.

3. The method of claim 1,
wherein the handover is triggered in response to a 5G coverage loss of the UE.

4. The method of claim 1, further comprising:
at the network node comprising the control plane functionality for managing the session,
　based on identifying that the UL-CL UPF is in use for the local offloading, sending to the UL-CL UPF a session modification request for establishing at least one uplink tunnel for the at least one bearer of the session; and
　obtaining from the UL-CL UPF a session modification response which includes at least one uplink tunnel endpoint identifier of the UL-CL UPF for the at least one uplink tunnel,
　wherein sending to the AMF the session context response which includes the uplink tunnel information of the UL-CL UPF includes uplink tunnel information comprising an IP address of the UL-CL UPF and the uplink tunnel endpoint identifier of the UL-CL UPF.

5. The method of claim 4, further comprising:
at the network node comprising the control plane functionality for managing the session,
　based on identifying that the UL-CL UPF is not in use for the local offloading, sending to the UPF anchor a session modification request for establishing the at least one uplink tunnel for the at least one bearer of the session; and
　obtaining from the UPF anchor a session modification response which includes at least one uplink tunnel endpoint identifier of the UPF anchor for the at least one uplink tunnel,
　wherein sending to the AMF the session context response which includes the uplink tunnel information of the UL-CL UPF includes uplink tunnel information comprising an IP address of the UPF anchor and the uplink tunnel endpoint identifier of the UPF anchor.

6. The method of claim 4, further comprising:
at the network node comprising the control plane functionality for managing the session,
　based on identifying that the UL-CL UPF is in use for the local offloading, obtaining downlink tunnel information of the SGW for the at least one bearer of the session;
　sending to the UL-CL UPF a session modification request for establishing at least one downlink tunnel for the at least one bearer of the session, the session modification request including the downlink tunnel information of the SGW; and
　obtaining from the UL-CL UPF a session modification response.

7. The method of claim 6, further comprising:
at the network node comprising the control plane functionality for managing the session,
　prior to sending to the UL-CL UPF the session modification request, obtaining from the SGW a modify bearer request which includes a downlink tunnel endpoint identifier of the SGW for the at least one downlink tunnel,
　wherein sending to the UL-CL UPF the session modification request which includes the downlink tunnel information of the SGW includes downlink tunnel information comprising an IP address of the SGW and the downlink tunnel endpoint identifier of the SGW.

8. The method of claim 1, wherein the control plane functionality for managing the session comprises a Session Management Function (SMF) plus a Packet Data Network Gateway Control Plane Function (PGW-C) (SMF+PGW-C).

9. A computer program product comprising:
a non-transitory computer readable medium;
instructions in the non-transitory computer readable medium;
the instructions being executable by one or more processors of a network node for implementing control plane functionality for managing a session of a user equipment (UE), wherein the session is anchored at a User Plane Function (UPF) anchor for communicating traffic between the UE and a data network, by:
　obtaining from an Access and Mobility Management Function (AMF) a session context request responsive to a handover indication indicating a handover of the session from a Fifth Generation System (5GS) to an Evolved Packet System (EPS);
　identifying whether an uplink classifier (UL-CL) UPF is in use for a local offloading of local uplink traffic of the session towards a local UPF anchor for delivery to a local area data network;
　based on identifying that the UL-CL UPF is not in use for the local offloading, obtaining uplink tunnel information of the UPF anchor for at least one bearer of the session and sending to the AMF a session context response which includes the uplink tunnel information of the UPF anchor, to cause the at least one bearer to be established between a Serving Gateway (SGW) and the UPF anchor for the handover of the session from the 5GS to the EPS; and
　based on identifying that the UL-CL UPF is in use for the local offloading, obtaining uplink tunnel information of the UL-CL UPF for the at least one bearer of the session and sending to the AMF the session context response which includes the uplink tunnel information of the UL-CL UPF, to cause the at least one bearer to be established between the SGW and the UL-CL UPF for the handover of the session from the 5GS to the EPS for maintaining the local offloading of the local uplink traffic.

10. The computer program product of claim 9, wherein the control plane functionality for managing the session comprises a Session Management Function (SMF) plus a Packet Data Network Gateway Control Plane Function (PGW-C) (SMF+PGW-C) configured for interworking between the 5GS and the EPS.

11. A method comprising:
- at a network node having control plane functionality for managing a session of a user equipment (UE), wherein the session is anchored at a User Plane Function (UPF) anchor for communicating traffic between the UE and a data network;
    - obtaining from an Access and Mobility Management Function (AMF) a session context request responsive to a handover indication indicating a handover of the session from a Fifth Generation System (5GS) to an Evolved Packet System (EPS);
    - identifying whether an uplink classifier (UL-CL) UPF is in use for a local offloading of local uplink traffic of the session towards a local UPF anchor for delivery to a local area data network;
    - based on identifying that the UL-CL UPF is not in use for the local offloading, obtaining uplink tunnel information of the UPF anchor for at least one bearer of the session and sending to the AMF a session context response which includes the uplink tunnel information of the UPF anchor, to cause the at least one bearer to be established between a Serving Gateway (SGW) and the UPF anchor for the handover of the session from the 5GS to the EPS; and
    - based on identifying that the UL-CL UPF is in use for the local offloading, obtaining uplink tunnel information of one of the UL-CL UPF, the UPF anchor that is provisioned with one or more UL-CL rules, or a combination of both the UPF anchor and the local UPF anchor for at least one bearer of the session, and sending to the AMF the session context response which includes the uplink tunnel information, to cause the at least one bearer to be established between the SGW and the one of the UL-CL UPF, the UPF anchor that is provisioned with the one or more UL-CL rules, or the combination of both the UPF anchor and the local UPF anchor, for the handover of the session from the 5GS to the EPS for maintaining the local offloading of the local uplink traffic.

12. The method of claim 11,
- wherein the control plane functionality for managing the session comprises a Session Management Function (SMF) plus a Packet Data Network Gateway Control Plane Function (PGW-C) (SMF+PGW-C).

13. The method of claim 11,
- wherein the handover is triggered in response to an EPS fallback for the UE.

14. The method of claim 11 wherein obtaining the uplink tunnel information of the one of the UL-CL UPF, the UPF anchor that is provisioned with the one or more UL-CL rules, or the combination of both the UPF anchor and the local UPF anchor for the at least one bearer of the session further comprises obtaining uplink tunnel information of the UL-CL UPF for the at least one bearer of the session, the method further comprising:
- sending to the UL-CL UPF a session modification request for establishing at least one uplink tunnel for the at least one bearer of the session; and
- obtaining from the UL-CL UPF a session modification response which includes at least one uplink tunnel endpoint identifier of the UL-CL UPF for the at least one uplink tunnel,
- wherein sending to the AMF the session context response which includes the uplink tunnel information includes uplink tunnel information comprising an IP address of the UL-CL UPF and the uplink tunnel endpoint identifier of the UL-CL UPF.

15. The method of claim 14, further comprising:
- at the network node comprising the control plane functionality for managing the session,
    - obtaining from the SGW a modify bearer request which includes a downlink tunnel endpoint identifier of the SGW;
    - sending to the UL-CL UPF a session modification request for establishing at least one downlink tunnel for the at least one bearer of the session, the session modification request including downlink tunnel information of the SGW which includes an IP address of the SGW and the downlink tunnel endpoint identifier of the SGW; and
    - obtaining from the UL-CL UPF a session modification response.

16. The method of claim 11 wherein obtaining the uplink tunnel information of the one of the UL-CL UPF, the UPF anchor that is provisioned with the one or more UL-CL rules, or the combination of both the UPF anchor and the local UPF anchor for the at least one bearer of the session further comprises obtaining uplink tunnel information of the UPF anchor that is provisioned with the one or more UL-CL rules for the at least one bearer of the session, the method further comprising:
- sending to the UPF anchor a session modification request for establishing at least one uplink tunnel for the at least one bearer of the session, the session modification request including the one or more UL-CL rules for provisioning the UPF anchor for the local offloading of local uplink traffic of the session towards the local UPF anchor for delivery to the local area data network; and
- obtaining from the UPF anchor that is provisioned with the one or more UL-CL rules a session modification response which includes at least one uplink tunnel endpoint identifier of the UPF anchor for the at least one uplink tunnel,
- wherein sending to the AMF the session context response which includes the uplink tunnel information includes uplink tunnel information comprising an IP address of the UPF anchor that is provisioned with the one or more UL-CL rules and the uplink tunnel endpoint identifier of the UPF anchor that is provisioned with the one or more UL-CL rules.

17. The method of claim 16, further comprising:
- at the network node comprising the control plane functionality for managing the session,
    - obtaining from the SGW a modify bearer request which includes a downlink tunnel endpoint identifier of the SGW;
    - sending to the UPF anchor that is provisioned with the one or more UL-CL rules a session modification request for establishing at least one downlink tunnel for the at least one bearer of the session, the session modification request including downlink tunnel information of the SGW which includes an IP address of the SGW and the downlink tunnel endpoint identifier of the SGW; and obtaining from the UPF anchor that is provisioned with the one or more UL-CL rules a session modification response.

18. The method of claim 11, further comprising:
at the network node comprising the control plane functionality for managing the session, prior to obtaining from the AMF the session context request responsive to the handover indication,
performing a session modification procedure for session modification involving the UPF anchor, for assigning a first portion of traffic to a first Quality of Service (QoS) flow that is separate from a second portion of traffic assigned to a second QoS flow; and
performing an UL-CL insertion procedure for insertion of the UL-CL UPF which includes provisioning the UL-CL UPF with one or more UL-CL rules for the local offloading of the local uplink traffic of the session, wherein the local offloading of the local uplink traffic comprises the first portion of traffic that is assigned to the first QoS flow.

19. The method of claim 18, wherein obtaining the uplink tunnel information of the one of the UL-CL UPF, the UPF anchor that is provisioned with the one or more UL-CL rules, or the combination of both the UPF anchor and the local UPF anchor for the at least one bearer of the session further comprises obtaining uplink tunnel information of the combination of both the UPF anchor and the local UPF anchor for the at least one bearer of the session, the method further comprising:
sending to the UPF anchor a first session modification request for establishing at least one first uplink tunnel for at least one first bearer;
obtaining from the UPF anchor a first session modification response which includes at least one first uplink tunnel endpoint identifier of the UPF anchor for the at least one first uplink tunnel;
sending to the local UPF anchor a second session modification request for establishing at least one second uplink tunnel for at least one second bearer; and
obtaining from the local UPF anchor a second session modification response which includes at least one second uplink tunnel endpoint identifier of the local UPF anchor for the at least one second uplink tunnel,
wherein sending to the AMF the session context response which includes the uplink tunnel information includes uplink tunnel information comprising a first IP address of the UPF anchor and the first uplink tunnel endpoint identifier of the UPF anchor, and additionally a second IP address of the local UPF anchor and the second uplink tunnel endpoint identifier of the local UPF anchor,
wherein sending to the AMF the session context response which includes the uplink tunnel information causes the at least the first bearer to be established between the SGW and the UPF anchor for communicating the second portion of traffic that is assigned to the second QoS flow, and causes the at least the second bearer to be established between the SGW and the local UPF anchor for the local offloading of the local uplink traffic comprising the first portion of traffic that is assigned to the first QoS flow.

20. The method of claim 19, further comprising:
at the network node comprising the control plane functionality for managing the session,
obtaining from the SGW a modify bearer request which includes a first downlink tunnel endpoint identifier of the SGW and a second downlink tunnel endpoint identifier of the SGW;
sending to the UPF anchor a first session modification request for establishing at least one first downlink tunnel for the at least one first bearer, the first session modification request including first downlink tunnel information of the SGW which includes an IP address of the SGW and the first downlink tunnel endpoint identifier of the SGW for the at least one first downlink tunnel;
obtaining from the UPF anchor a first session modification response;
sending to the local UPF anchor a second session modification request for establishing at least one second downlink tunnel for the at least one second bearer, the second session modification request including second downlink tunnel information of the SGW which includes the IP address of the SGW and the second downlink tunnel endpoint identifier of the SGW for the at least one second downlink tunnel;
obtaining from the local UPF anchor a second session modification response; and
sending to the SGW a modify bearer response.

* * * * *